United States Patent
Tsunematsu et al.

(10) Patent No.: US 11,895,952 B2
(45) Date of Patent: *Feb. 13, 2024

(54) AGRICULTURAL AND HORTICULTURAL COVERING FILM AND METHOD FOR PRODUCING THE SAME

(71) Applicant: SUMITOMO METAL MINING CO., LTD., Tokyo (JP)

(72) Inventors: Hirofumi Tsunematsu, Isa (JP); Takeshi Chonan, Isa (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 910 days.

This patent is subject to a terminal disclaimer.

(21) Appl. No.: 16/623,970

(22) PCT Filed: Jun. 19, 2018

(86) PCT No.: PCT/JP2018/023365
§ 371 (c)(1),
(2) Date: Feb. 27, 2020

(87) PCT Pub. No.: WO2018/235840
PCT Pub. Date: Dec. 27, 2018

(65) Prior Publication Data
US 2020/0267913 A1 Aug. 27, 2020

(30) Foreign Application Priority Data
Jun. 19, 2017 (WO) .................. PCT/JP2017/022528

(51) Int. Cl.
*A01G 13/02* (2006.01)
*C01G 41/02* (2006.01)
(Continued)

(52) U.S. Cl.
CPC ......... *A01G 13/0275* (2013.01); *C01G 41/02* (2013.01); *C08J 7/0427* (2020.01);
(Continued)

(58) Field of Classification Search
None
See application file for complete search history.

(56) References Cited

U.S. PATENT DOCUMENTS

2018/0170021 A1* 6/2018 Machida .................. B32B 27/18
2018/0370813 A1* 12/2018 Tsunematsu ........... G02B 5/208

FOREIGN PATENT DOCUMENTS

EP        1 859 674 A1     11/2007
JP        S55-127946 A     10/1980
(Continued)

OTHER PUBLICATIONS

English translation of Kenichi (JP 2009-144037) (Year: 2009).*
(Continued)

*Primary Examiner* — Ronak C Patel
(74) *Attorney, Agent, or Firm* — Oliff PLC

(57) ABSTRACT

An agricultural and horticultural film that does not raise a temperature of an atmosphere such as a greenhouse by using the agricultural and horticultural film in the greenhouse, etc., while absorbing infrared rays from the sunlight and warming the soil, the film having an infrared absorbing layer containing infrared absorbing material ultrafine particles, wherein the infrared absorbing material ultrafine particles are composite tungsten oxide ultrafine particles, and the composite tungsten oxide ultrafine particles have a XRD peak top intensity ratio value of 0.13 or more based on an XRD peak intensity ratio value of 1 on plane of a silicon powder standard sample (640c produced by NIST).

11 Claims, 2 Drawing Sheets

(51) Int. Cl.
*C09C 3/06* (2006.01)
*C08J 7/04* (2020.01)

(52) U.S. Cl.
CPC .......... *C09C 3/063* (2013.01); *C01P 2002/30* (2013.01); *C01P 2002/72* (2013.01); *C01P 2004/62* (2013.01); *C01P 2004/64* (2013.01); *C01P 2006/90* (2013.01)

(56) References Cited

FOREIGN PATENT DOCUMENTS

| | | | |
|---|---|---|---|
| JP | H09-107815 A | | 4/1997 |
| JP | 2011-50307 A | | 3/2011 |
| JP | 2015-199668 A | | 11/2015 |
| WO | WO 2017/002763 | * | 1/2005 |
| WO | 2006/100799 A1 | | 9/2006 |
| WO | 2017/104853 A1 | | 6/2017 |

OTHER PUBLICATIONS

English translation of Kenichi (JP 5895895) (Year: 2016).*
English translation of JP 2005-534528 (Year: 2005).*
Liu et al. Morphology and phase-controlled synthesis of CsxWO3 powders by solvothermal method and their optical properties, Powder Technology, 270, 2015, 329-336 (Year: 2015).*
Jul. 17, 2018 Search Report issued in International Patent Application No. PCT/JP2018/023365.
NIST: "Powder diffraction SRMs;" 2016; URL: https://www.nist.gov/programs-projects/powder-diffraction-srms.
Feb. 15, 2021 Search Report issued in European Patent Application No. 18820099.2.
Chen et al, "Preparation and near-infrared photothermal conversion property of cesium tungsten oxide nanoparticles", Nanoscale Research Letters, a SpringerOpen Journal, 2013, pp. 1-8.

* cited by examiner

AGRICULTURAL AND HORTICULTURAL COVERING FILM AND METHOD FOR PRODUCING THE SAME

TECHNICAL FIELD

The present invention relates to an agricultural and horticultural covering film and a method for producing the same.

DESCRIPTION OF RELATED ART

A method for covering a soil surface with a reflective sheet using a metal layer such as aluminum, a sheet that reflects white light using a layer made of a white light reflecting material, and a sheet in which a surface of the reflective sheet is further coated with a reflective material, is known as a way to promote plant growth. On the other hand, a synthetic resin sheet such as polyethylene or polyvinyl chloride is generally known as a sheet to keep the soil warm.

However, since the sheets coated with these reflective materials uniformly reflect the sunlight that reaches the earth's surface, infrared light that becomes heat is also reflected although the plant growth is promoted, and therefore when used in a greenhouse or the like, there is a problem that the temperature of the atmosphere in the greenhouse or the like increases. Further, the reflective sheet using a metal layer such as aluminum is generally subjected to aluminum vapor deposition, which has a problem of cost increase.

On the other hand, the synthetic resin sheet that keeps the soil warm generally have a high infrared transmittance, and thus has insufficient soil heat-retaining effects.

In order to solve these problems, Patent Document 1 discloses a heat insulation sheet covering the ground, in which a band-shaped film having infrared reflectivity and a band-shaped film having infrared absorptivity are each used as a knitted fabric as warp or weft.

Further, Patent Document 2 discloses an agricultural film in which black or blue pigment such as carbon black are dispersed in a binder and printed on the surface of a whitened film having a total light transmittance of 3.0% or more and a diffuse reflectance of 40% or more.

Patent Document 3 discloses an agricultural and horticultural covering film in which tungsten oxide ultrafine particles and composite tungsten oxide ultrafine particles are selected as the material that absorbs infrared light, and these ultrafine particles are contained as near-infrared absorbing components, despite high visible light reflectance.

PRIOR ART DOCUMENT

Patent Document

[Patent Document 1] Japanese Patent Laid Open Publication No. 1997-107815
[Patent Document 2] Japanese Patent Laid Open Publication No. 1980-127946
[Patent Document 3] WO2006/100799

DISCLOSURE OF THE INVENTION

Problem to be Solved by the Invention

However, according to the study by the present inventors, a heat retention sheet according to Patent Document 1 is a film in which an infrared reflective film is subjected to aluminum vapor deposition processing. Therefore, there is a problem that a manufacturing cost is high.

Further, in the agricultural and horticultural film according to Patent Document 2, an area of a colored coating layer is 1.0 to 60%, which is not a configuration that efficiently absorbs infrared rays that become heat. Therefore, there is a problem that an effect of heating the soil is not sufficient.

When the agricultural and horticultural film according to Patent Document 3 is used in a green house, etc., for supplying a light required for plant growth and absorbing infrared light to warm the soil, the temperature of the atmosphere such as the greenhouse is not allowed to rise. However, according to further study by the present inventors, the tungsten oxide ultrafine particles or the composite tungsten oxide ultrafine particles produced by the method proposed in Patent Document 3 have low crystallinity, and therefore it is found that the infrared absorption properties of the agricultural and horticultural covering film containing the ultrafine particles are not sufficient.

In order to solve the above problems, the present invention is provided, and an object of the present invention is to provide the agricultural and horticultural film that does not raise a temperature of an atmosphere such as a greenhouse by using the agricultural and horticultural film in the greenhouse, etc., while absorbing the infrared rays from the sunlight and warming the soil.

Means for Solving the Problem

The present inventors have intensively studied to achieve the above object, and as a result, found the composite tungsten oxide ultrafine particles whose X-ray diffraction (may be described as "XRD" in the present invention) pattern shows that a value of an XRD peak top intensity ratio is a predetermined value. Specifically, the present inventors found the composite tungsten oxide ultrafine particles having an XRD peak top intensity ratio value of 0.13 or more based on an XRD peak intensity ratio value of 1 on plane (220) of a silicon powder standard sample (640c produced by NIST).

The composite tungsten oxide ultrafine particles are transparent in a visible light region and have high crystallinity, and therefore have excellent infrared absorption properties, which are versatile composite tungsten oxide ultrafine particles capable of producing a dispersion liquid containing the composite tungsten oxide ultrafine particles with high productivity.

Then, it is found that an infrared absorbing layer containing the composite tungsten oxide ultrafine particles as infrared absorbing components, absorbs sunlight, especially near-infrared light more efficiently, and at the same time transmits light in the visible light region. Thus, the present invention is completed.

Namely, in order to solve the above-described problem, a first invention is an agricultural and horticultural film having an infrared absorbing layer containing infrared absorbing material ultrafine particles,
wherein the infrared absorbing material ultrafine particles are composite tungsten oxide ultrafine particles, and
the composite tungsten oxide ultrafine particles have a XRD peak top intensity ratio value of 0.13 or more based on an XRD peak intensity ratio value of 1 on plane (220) of a silicon powder standard sample (640c produced by NIST).

A second invention is the agricultural and horticultural film according to the first invention, wherein an infrared absorbing layer in which the infrared absorbing material ultrafine particles are dispersed in a resin binder is provided on at least one surface of the agricultural and horticultural covering film.

A third invention is the agricultural and horticultural film according to the first invention or the second invention, wherein the infrared absorbing material ultrafine particles are present in a dispersed state inside the agricultural and horticultural covering film.

A fourth invention is the agricultural and horticultural film according to any one of the first to third inventions, wherein a crystallite size of the composite tungsten oxide ultrafine particles is 1 nm or more and 200 nm or less.

A fifth invention is the agricultural and horticultural film according to any one of the first to fourth inventions, wherein the composite tungsten oxide ultrafine particles are particles represented by general formula $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, $2.2 \leq z/y \leq 3.0$).

A sixth invention is the agricultural and horticultural film according to any one of the first to fifth inventions, wherein the composite tungsten oxide ultrafine particles include a hexagonal crystal structure.

A seventh invention is the agricultural and horticultural film according to any one of the first to sixth inventions, wherein a content of a volatile component in the composite tungsten oxide ultrafine particles is 2.5 mass % or less.

An eighth invention is the agricultural and horticultural film according to any one of the first to seventh inventions, wherein a surface of the composite tungsten oxide ultrafine particles is coated with an oxide containing at least one or more elements selected from Si, Ti, Zr, and Al.

A ninth invention is the agricultural and horticultural film according to any one of the first to eighth inventions, wherein the film is at least one or more elements selected from polyethylene, polypropylene, polyethylene terephthalate, polyvinyl fluoride, polyvinylidene fluoride, polytetrafluoroethylene, tetrafluoroethylene-ethylene copolymer, polychlorotrifluoroethylene, tetrachlorotrifluoroethylene, polyvinyl chloride, polyvinylidene chloride, polyvinyl alcohol, polystyrene, ethylene vinyl acetate, and polyester resin.

A tenth invention is the agricultural and horticultural film according to any one of the first to ninth inventions, wherein a white light reflecting layer in which a white reflecting material is dispersed is provided inside the film of the agricultural and horticultural covering film.

An eleventh invention is the agricultural and horticultural film according to any one of the first to eighth inventions:
having a white light reflecting layer formed by coating its one surface with a white light reflecting material, and an infrared light absorbing layer formed by further coating the white light reflecting layer with infrared absorbing material ultrafine particles, or
having a white light reflecting layer formed by coating its one surface with a white light reflecting material, and an infrared absorbing layer formed by coating it's the other surface with infrared absorbing material ultrafine particles.

A twelfth invention is the agricultural and horticultural film according to the tenth or eleventh invention, wherein the white light reflecting material is at least one or more selected from $TiO_2$, $ZrO_2$, $SiO_2$, $Al_2O_3$, MgO, ZnO, $CaCO_3$, $BaSO_4$, ZnS, and $PbCO_3$.

A thirteenth invention is a method for producing an agricultural and horticultural film having an infrared absorbing layer containing infrared absorbing material ultrafine particles,
wherein the infrared absorbing material ultrafine particles are composite tungsten oxide ultrafine particles,
the method including:
producing by firing the composite tungsten oxide ultrafine particles so as to have a XRD peak top intensity ratio value of 0.13 or more based on an XRD peak intensity ratio value of 1 on plane (220) of a silicon powder standard sample (640c produced by NIST); and
adding the produced composite tungsten oxide ultrafine particles into the infrared absorbing layer, while maintaining the XRD peak top intensity ratio value at 0.13 or more.

Advantage of the Invention

The agricultural and horticultural covering film according to the present invention efficiently absorbs infrared rays from sunlight. Therefore, a temperature of the covered ground rises and the soil is warmed by using the agricultural and horticultural covering film on the ground where plants are grown. On the other hand, when the agricultural and horticultural covering film is used in a greenhouse or the like, there is an effect that the temperature of the atmosphere in the greenhouse or the like is not raised.

DETAILED DESCRIPTION OF THE INVENTION

Figure 1:
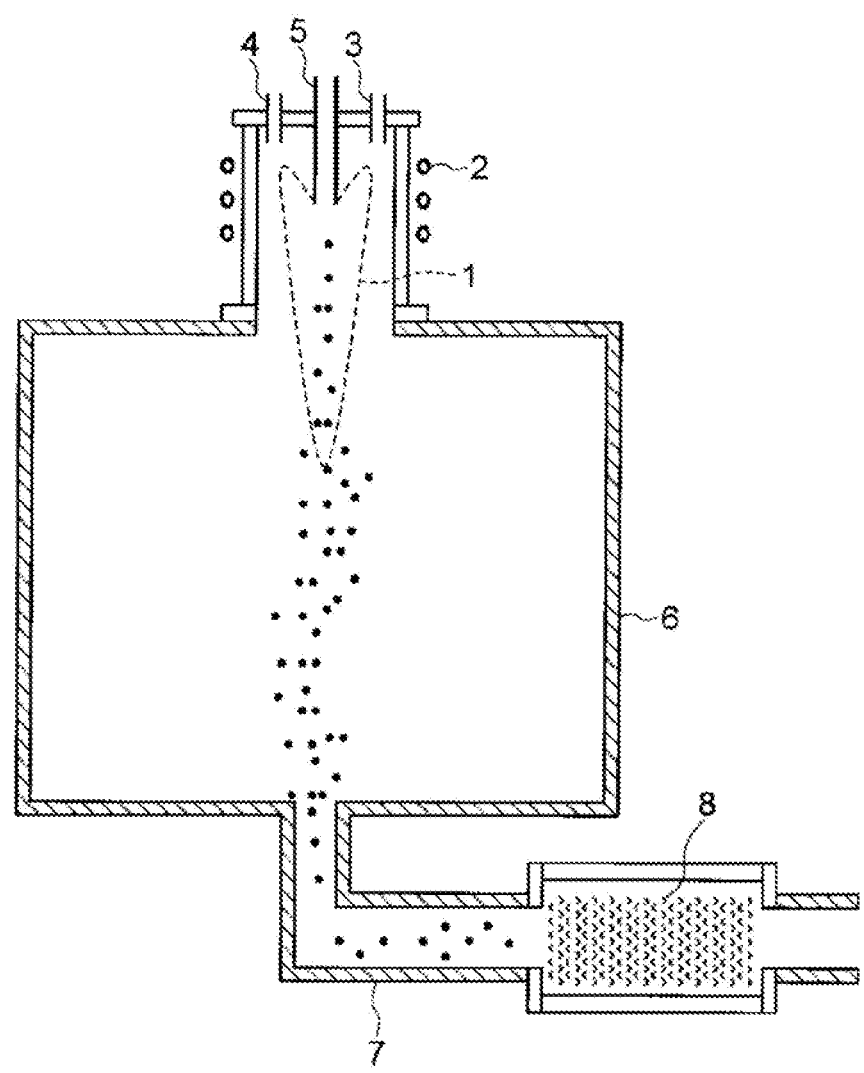
FIG. 1 is a conceptual diagram of a high-frequency plasma reactor used in the present invention.

Embodiments of the present invention will be described hereafter, in an order of: [a] composite tungsten oxide ultrafine particles, [b] method for synthesizing composite tungsten oxide ultrafine particles, [C] volatile component of composite tungsten oxide ultrafine particles and method for drying the same, [d] composite tungsten oxide ultrafine particle dispersion liquid, [e] agricultural and horticultural covering film.

[a] Composite Tungsten Oxide Ultrafine Particles

An agricultural and horticultural covering film according to the present invention is a film having a white light reflecting layer containing a white light reflecting material, and an infrared absorbing layer containing composite tungsten oxide ultrafine particles as infrared absorbing material ultrafine particles, and is a film having high diffuse reflectance of light in a visible light region and high absorptance of light in an infrared region. Therefore, the composite tungsten oxide ultrafine particles which are the infrared absorbing material ultrafine particles will be described first.

The composite tungsten oxide ultrafine particles according to the present invention have near infrared absorption properties, and have a XRD peak top intensity ratio value of 0.13 or more based on a XRD peak intensity ratio value of 1 on plane (220) of a silicon powder standard sample (640c produced by NIST).

The composite tungsten oxide ultrafine particles of the present invention will be described hereafter, in an order of (1) XRD peak top intensity ratio, (2) composition, (3) crystal structure, (4) BET specific surface area, (5) volatile component, and (6) summary.

(1) XRD Peak Top Intensity Ratio

A powder X-ray diffraction method is used to measure the XRD peak top intensity of the composite tungsten oxide ultrafine particles described above. At this tithe, in order to provide objective quantification of the measurement results between the samples of the composite tungsten oxide ultrafine particles, a standard sample is determined and the peak intensity of the standard sample is measured, and the XRD peak top intensity ratio value of the ultrafine particle sample with respect to the peak intensity of the standard sample was used to represent the XRD peak top intensity of each ultrafine particle sample.

Here, a silicon powder standard sample (manufactured by NIST, 640c) which is universal in the industry is used as the standard sample, and the (220) plane in the silicon powder standard sample, which does not overlap with the XRD peak of the composite tungsten oxide ultrafine particles, was used as a reference.

In order to further provide the quantification, other measurement conditions were always kept constant.

Specifically, a sample holder having a depth of 1.0 mm is filled with an ultrafine particle sample by a known operation at the time of X-ray diffraction measurement. Specifically, it is preferable that in order to prevent a preferred orientation (crystal orientation) from generating in the ultrafine particle sample, the sample holder is filled randomly, gradually and as tightly as possible.

As an X-ray source, an X-ray tube whose target material of the anode is Cu, is used at an output setting of 45 kV/40 mA, and the X-ray peak top intensity is measured by the powder X-ray diffraction method for θ-2θ in a step scan mode (step size: 0.0165° (2θ) and counting time: 0.022 ms/step).

At this time, the XRD peak intensity is varied according to the use time of the X-ray tube, and therefore it is preferable that the use time of the X-ray tube is almost the same among samples. In order to ensure objective quantification, it is necessary that a difference between the samples during the use time of the X-ray tube be at most 1/20 or less of a predicted lifetime of the X-ray tube. As a more preferable measurement method, there is a method for calculating the XRD peak intensity ratio by performing measurement of the silicon powder standard sample every time the X-ray diffraction pattern of the composite tungsten oxide ultrafine particles is measured. Such a measurement method is used in the present invention. The X-ray tube predicted lifetime of a commercially available X-ray device is mostly several thousand hours or more and the measurement time per sample is several hours or less, and therefore by performing the above-described preferable measurement method, an influence on the XRD peak top intensity ratio due to the use time of the X-ray tube can be made negligibly small. Further, in order to keep the temperature of the X-ray tube constant, a cooling water temperature for the X-ray tube is preferably kept constant.

Note that the X-ray diffraction pattern of the composite tungsten oxide ultrafine particles is the X-ray diffraction patterns of a large number of composite tungsten oxide ultrafine particles constituting the composite tungsten oxide powder sample, and is the X-ray diffraction pattern of the composite tungsten oxide ultrafine particles after disintegration, pulverization or dispersion described later to obtain a composite tungsten oxide ultrafine particle dispersion liquid. Thus, the X-ray diffraction pattern of the composite tungsten oxide ultrafine particles according to the present invention and the composite tungsten oxide ultrafine particles contained in the dispersion liquid thereof is also maintained in the X-ray diffraction pattern of a composite tungsten oxide ultrafine particle dispersion body according to the present invention.

The XRD peak top intensity is the peak intensity at 2θ where the peak count is highest in the X-ray diffraction pattern. In hexagonal Cs composite tungsten oxide and Rb composite tungsten oxide, the peak count 2θ in the X-ray diffraction pattern appears in a range of 25° to 31°.

The XRD peak top intensity of the composite tungsten oxide ultrafine particles described above is closely related to the crystallinity of the ultrafine particles, and a as a result, it is closely related to a free electron density of the fine particles. The present inventors found that the XRD peak top intensity greatly affects the near-infrared absorption properties of the composite tungsten oxide ultrafine particles. Specifically, it is found that since the XRD peak top intensity ratio value is 0.13 or more, free electron density in the ultrafine particles is ensured, and desired near-infrared absorption properties can be obtained. Note that the XRD peak top intensity ratio value may be 0.13 or more, and is preferably 0.7 or less.

The XRD peak top intensity of the composite tungsten oxide ultrafine particles will also be explained from a different viewpoint.

The fact that the XRD peak top intensity ratio value of the composite tungsten oxide fine particle is 0.13 or more, shows that the composite tungsten oxide ultrafine particles with good crystallinity containing almost no hetero phases have been obtained. Namely, it is considered that the obtained composite tungsten oxide ultrafine particles are not amorphized. As a result, it is considered that by dispersing the composite tungsten oxide ultrafine particles containing almost no hetero phases in a liquid medium transmitting visible light, near infrared shielding properties can be sufficiently obtained.

Note that in the present invention, the "hetero phase" means a phase of a compound other than the composite tungsten oxide. As a result, it is considered that the near-infrared absorption properties can be sufficiently obtained by dispersing the composite tungsten oxide ultrafine particles containing almost no hetero phases, into liquid media such as organic solvents that transmit visible light, and solid media such as resin that transmits visible light.

Note that in the present invention, the "hetero phase" means a phase of a compound other than the composite tungsten oxide. The crystal structure and the crystallite size of composite tungsten oxide ultrafine particles can be obtained by analyzing the X-ray diffraction pattern obtained when measuring the XRD peak top intensity.

(2) Composition

The composite tungsten oxide ultrafine particles of the present invention are preferably represented by a general formula $M_xW_yO_z$ (wherein, M is an element of one or more selected from H, He, alkali metal, alkaline earth metal, rare earth M elementg, Zr, Cr, Mn, Fe, Ru, Co, Rh, Ir, Ni, Pd, Pt, Cu, Ag, Au, Zn Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, $2.2 \leq z/y \leq 3.0$).

The composite tungsten oxide ultrafine particles represented by the general formula $M_xW_yO_z$ will be described.

The M element, x, y, z and the crystal structure thereof in the general formula $M_xW_yO_z$ are closely related to the free electron density of the composite tungsten oxide ultrafine particles, and have a significant effect on near-infrared absorption properties.

Generally, tungsten trioxide ($WO_3$) has low near-infrared absorption properties because effective free electrons do not exist.

Here, the present inventors found that by adding to the composite tungsten oxide the M element (wherein, the M element is one or more elements selected from H, He, alkali metal, alkaline earth metal, rare earth M elementg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, S, Se, Br, Te, Ti, Nb, V, Mo, Ta, Re, Be, Hf, Os, Bi, I, and Yb) to obtain the composite tungsten oxide, the free electrons are generated in the composite tungsten oxide, and the absorption property derived from the free electrons appears in the near-infrared region and therefore the composite tungsten oxide is also effective as a near-infrared absorbing material in the vicinity of 1000 nm in wavelength, and the composite tungsten oxide maintains a chemically stable state, and therefore is effective as a near-infrared absorbing material with excellent weather resistance. Further, the M element is preferably Cs, Rb, K, Tl, Ba, Cu, Al, Mn, or In. Among them, in the case of Cs or Rb as the M element, the composite tungsten oxide easily has a hexagonal structure. As a result, it is also found that the visible light is transmitted and the near-infrared light is absorbed, which is particularly preferable for the reasons described below.

Here, the findings of the present inventors regarding the value of x indicating an addition amount of the M element will be described.

When the value of x/y is 0.001 or more, a sufficient amount of free electrons is generated, and desired near-infrared absorption properties can be obtained. Then, as the addition amount of the M element increases, the supply amount of the free electrons increases and the near-infrared absorption property also increases, but the effect is saturated when the value of x/y is about 1. Further, when the value of x/y is 1 or less, generation of an impurity phase in the composite tungsten ultrafine particles can be avoided, which is preferable.

Next, the findings of the present inventors regarding the value of z indicating the control of an oxygen amount will be described.

In the composite tungsten oxide ultrafine particles represented by the general formula MxWyOz, the value of z/y is preferably $2.0 < z/y \leq 3.0$, more preferably $2.2 \leq z/y \leq 3.0$, further preferably, $2.6 \leq z/y \leq 3.0$, and most preferably, $2.7 \leq z/y \leq 3.0$. This is because when the value of z/y is 2.0 or more, it is possible to avoid an appearance of a $WO_2$ crystal phase other than the intended one in the composite tungsten oxide, and to obtain a chemical stability as a material, and therefore an application as an effective infrared absorbing material is possible. In contrast, when the value of z/y is 3.0 or less, a required amount of free electrons is generated in the tungsten oxide, and the tungsten oxide becomes an efficient infrared absorbing material.

(3) Crystal Structure

Then, even when the composite tungsten oxide ultrafine particles take a tetragonal or a cubic tungsten bronze structure other than the above-described hexagonal crystal structure, the composite tungsten oxide ultrafine particles are effective as a near-infrared absorption material. However, an absorption position in the near-infrared region is likely to change depending on the crystal structure taken by the composite tungsten oxide ultrafine particles, and the absorption position in the near-infrared region is shifted to a longer wavelength side in a case of the tetragonal crystal structure than the cubic crystal structure, and the absorption position is likely to be shifted to a longer wavelength side further in a case of the hexagonal crystal structure than the tetragonal crystal structure. Further, in conjunction with a fluctuation of the absorption position, absorption in the visible light region is smallest in an order of the hexagonal crystal structure, the tetragonal crystal structure, and the cubic crystal structure in which absorption is largest among them.

Therefore, for applications in which light in the visible light region is more transmitted and light in the near-infrared region is more absorbed, it is most preferable to use the hexagonal tungsten bronze. When each composite tungsten oxide ultrafine particles has a hexagonal crystal structure, in the optical properties of the ultrafine particles, transmittance in the visible light region is improved and absorption in the near-infrared region is improved.

As described above, in the composite tungsten oxide, when the XRD peak top intensity ratio value satisfies a predetermined value and in a case of the hexagonal tungsten bronze, excellent optical properties are exhibited. Further, even when each composite tungsten oxide ultrafine particle has an orthorhombic crystal structure or a monoclinic crystal structure similar to $WO_{2.72}$ called the Magneli phase, it is excellent in infrared absorption, and it is effective as a near-infrared shielding material in some cases.

As described in the above finding, when each composite tungsten oxide ultrafine particle having a hexagonal crystal structure has a uniform crystal structure, the addition amount of the additional M element is preferably 0.2 or more and 0.5 or less, more preferably $0.29 \leq x/y \leq 0.39$ in terms of the value of x/y. Theoretically it is considered that when z/y=3, the value of x/y becomes 0.33, thereby arranging additional elements M in all hexagonal voids. Typical examples include $Cs_{0.33}WO_3$, $Cs_{0.03}Rb_{0.30}WO_3$, $Rb_{0.33}WO_3$, $K_{0.33}WO_3$, $Ba_{0.33}WO_3$ and the like.

Further, in the composite tungsten oxide ultrafine particles, it is preferable that the amorphous phase be a single crystal having a volume ratio of 50% or less.

When the composite tungsten oxide ultrafine particles are a single crystal having a volume ratio of the amorphous phase of 50% or less, it is possible to set the crystallite size to 200 nm or less while maintaining the XRD peak top intensity. By setting the crystallite size of the composite tungsten oxide ultrafine particles to 200 nm or less, the dispersed particle size can be set in a range of 10 nm or more and 200 nm or less, which is a preferable range from the viewpoint of near-infrared absorption properties and visible light transmission properties.

In contrast, when the amorphous phase is present in a volume ratio of 50% or more or in a case of polycrystal even when the dispersed particle size of the composite tungsten ultrafine particle is 1 nm or more and 200 nm or less, the XRD peak top intensity ratio value of the composite tungsten ultrafine particle is less than 0.13, and as a result, the near-infrared ray absorbing properties are insufficient and the contrast between visible light and near infrared light is not sufficiently expressed in some cases.

On the other hand, from the viewpoint of the near-infrared absorption properties, the crystallite diameter of the composite tungsten oxide fine particles is preferably 10 nm or more. It is more preferable that the ultrafine composite tungsten oxide particles have a crystallite size of 200 nm or less and 10 nm or more. This is because when the crystallite size is in the range of 200 nm or less and 10 nm or more, the XRD peak top intensity ratio value exceeds 0.13, and further excellent infrared absorption properties are exhibited.

Note that the X-ray diffraction pattern of the composite tungsten oxide ultrafine particles in the composite tungsten oxide ultrafine particle dispersion liquid after disintegration, pulverization or dispersion described below is also maintained in the X-ray diffraction pattern of the composite tungsten oxide ultrafine particles obtained by removing the volatile components in the composite tungsten oxide ultrafine particle dispersion liquid according to the present invention, or the X-ray diffraction pattern of the ultrafine composite tungsten oxide particles contained in the dispersion body obtained from the dispersion liquid.

As a result, the effect of the present invention is exhibited when a crystalline state is a crystalline state of the composite tungsten oxide fine particles that can be used in the present invention, such as the XRD pattern, the XRD peak top intensity, and the crystallite size of the composite tungsten oxide fine particles in the composite tungsten oxide fine particle dispersion liquid and the composite tungsten oxide fine particle dispersion body obtained from the dispersion liquid.

The fact that the composite tungsten oxide fine particles are single crystals can be confirmed from an electron microscope image by a transmission electron microscope in which no grain boundaries are observed inside each fine particle, and only uniform lattice fringes are observed. Further, the fact that the volume ratio of the amorphous phase volume ratio is 50% or less in the composite tungsten oxide fine particles can be confirmed from the same electron microscope image by the transmission electron microscope in which uniform lattice fringes are observed throughout the fine particles, and there are almost no unclear spots. Since the amorphous phase exists on the outer periphery of the fine particles in many cases, the volume ratio of the amorphous phase can be calculated by paying attention to the outer periphery of the fine particles in many cases. For example, in a spherical composite tungsten oxide fine particle, when the amorphous phase with unclear lattice fringes exists in a layered manner on the outer periphery of the fine particles, the volume ratio of the amorphous phase in the composite tungsten oxide fine particles is 50% or less, as long as the thickness of the layer is 10% or less of the particle size.

On the other hand, when the composite tungsten oxide fine particles are dispersed inside a coating layer constituting the composite tungsten oxide ultrafine particle dispersion body, and a layer obtained by applying a predetermined operation to the coating layer to cure the resin of the coating layer (referred to as a "cured layer" in the present invention, and corresponds to the "infrared absorbing layer" according to the present invention) as described later, the composite tungsten oxide ultrafine particles can be said to be a single crystal having the amorphous phase volume ratio of 50% or less and can be said to be substantially a single crystal, as long as the value obtained by subtracting the crystallite size from the average particle size of the dispersed composite tungsten oxide fine particles is 20% or less.

Here, the average particle size of the composite tungsten oxide ultrafine particles can be obtained from the transmission electron microscope image of the composite tungsten oxide ultrafine particle dispersion body, by using an image processing device to measure the particle size of 100 composite tungsten oxide fine particles, and calculate the average value thereof. Then, synthesis, pulverization, and dispersion may be suitably performed depending on production equipment, so that the difference between the average particle size and the crystallite size of the composite tungsten oxide fine particles dispersed in the composite tungsten oxide ultrafine particle dispersion body of the present invention is 20% or less.

(4) BET Specific Surface Area

BET specific surface area of the composite tungsten oxide ultrafine particles are closely related to the particle size distribution of the ultrafine particles, and at the same time, greatly affect productivity of the near-infrared absorbing dispersion liquid with the ultrafine particles as a raw material, and the near-infrared absorption properties of the ultrafine particles themselves and light resistance to suppress photo coloring.

The small BET specific surface area of the composite tungsten oxide fine particles indicates that the crystallite size of the ultrafine particles is large. Therefore, when the BET specific surface area of the ultrafine particles is a predetermined value or more, there is no need to pulverize the ultrafine particles for a long time with a medium stirring mill to produce the near-infrared absorbing dispersion liquid that is transparent in the visible light region and can suppress the above-described blue haze phenomenon, and the productivity of the near-infrared absorbing dispersion liquid can be improved.

The fact that the BET specific surface area of the ultrafine particles is equal to or less than a predetermined value, for example, 200 $m^2/g$ or less, indicates that the BET particle size becomes 2 nm or more when the particle shape is assumed to be true spherical, and means that almost no ultrafine particles exist having a crystallite size of less than 1 nm not contributing to near-infrared absorption properties. Therefore, when the BET specific surface area of the ultrafine particles is equal to or less than a predetermined value, the near-infrared absorption properties and the light resistance of the ultrafine particles are ensured.

When the value of the XRD peak top intensity described above is a predetermined value or more in addition to the fact that the BET specific surface area of the ultrafine particles is 200 $m^2/g$ or less, there are almost no ultrafine particles having a crystallite size of less than 1 nm not contributing to the near-infrared absorption properties, but there are ultrafine particles having good crystallinity. Therefore, it can be considered that the near-infrared absorption properties and the light resistance of the ultrafine particles are thereby ensured.

To measure the BET specific surface area of the composite tungsten oxide ultrafine particles described above, nitrogen gas, argon gas, krypton gas, xenon gas or the like is used as the gas used for the adsorption. However, when a measurement sample is powder, with the specific surface area being 0.1 $m^2/g$ or more like the composite tungsten oxide ultrafine particles according to the present invention, it is desirable to use low-cost nitrogen gas which is relatively easy to handle. The BET specific surface area of the composite tungsten oxide ultrafine particles is preferably 30.0 $m^2/g$ or more and 120.0 $m^2/g$ or less, more preferably, 30.0 $m^2/g$ or more and 90.0 $m^2/g$ or less, and further preferably 35.0 $m^2/g$ or more and 70.0 $m^2/g$ or less. The BET specific surface area of the composite tungsten oxide ultrafine particles is preferably the above-described value before and after pulverization and dispersion when obtaining the composite tungsten oxide ultrafine particle dispersion liquid.

(5) Volatile Component

The composite tungsten oxide fine particles may contain a component that volatilizes by heating (which may be described as "volatile component" in the present invention). The volatile component is derived from a substance adsorbed when the composite tungsten oxide particles are exposed to storage atmosphere or air, or during the synthesis treatment. Here, specific examples of the volatile component include water and a dispersion solvent described later, and for example, it is a component that volatilizes from the composite tungsten oxide fine particles by heating at 150° C. or less.

The volatile component and their contents in the composite tungsten oxide particles are, as described above, are closely related to a water content adsorbed when the fine particles are exposed to the atmosphere, and a residual amount of the solvent during drying of the fine particles. Then, the volatile component and the content thereof may greatly affect the dispersibility when the ultrafine particles are dispersed in the resin or the like.

For example, when the compatibility between the resin used in the near-infrared absorbing dispersion body described later and the volatile component adsorbed on the ultrafine particles is poor, and when the volatile component content in the ultrafine particles is large, it may cause haze (decrease in transparency) of the produced near-infrared absorbing dispersion body. Further, when the produced near-infrared absorbing dispersion body is installed outdoors for a long time and is exposed to sunlight or wind and rain, the composite tungsten oxide ultrafine particles may desorb to the outside of the near-infrared absorbing dispersion body, or the layer may peel off. Namely, the deterioration of the compatibility between the ultrafine particles and the resin causes deterioration of the produced near-infrared absorbing dispersion body. That is, the composite tungsten oxide ultrafine particles containing a large amount of volatile components, mean that whether the dispersion of the ultrafine particles is good or not may be affected by the compatibility with the dispersion medium used in a dispersion system. Accordingly, when the content of the volatile component in the composite tungsten oxide ultrafine particles according to the present invention is not more than a predetermined amount, wide versatility is exhibited.

According to the studies by the present inventors, it is found that when the content of the volatile component is 2.5 mass % or less in the composite tungsten oxide ultrafine particles, the ultrafine particles are dispersible in the dispersion medium used in most dispersion systems, and become versatile composite tungsten oxide ultrafine particles.

On the other hand, it is also found that there is no particular lower limit on the content of the volatile component.

As a result, when the ultrafine particles having a volatile component content of 2.5 mass % or less are not excessively secondary aggregated, the ultrafine particles can be dispersed in a resin or the like, by a method that mixes uniformly (including melt mixing) using mixers such as tumblers, Nauter mixers, Henschel mixers, super mixers, and planetary mixers, and kneading machines such as Banbury mixers, kneaders, rolls, single-screw extruders and twin-screw extruders.

The content of the volatile component in the composite tungsten oxide ultrafine particles can be measured by thermal analysis. Specifically, what is necessary is to measure a weight loss while holding a composite tungsten oxide ultrafine particle sample at a temperature lower than a temperature at which the composite tungsten oxide ultrafine particles thermally decompose and higher than a temperature at which volatile components evaporate.

Further, when specifying the volatile component, gas mass spectrometry may be used together.

(6) Summary

As described above in detail, the XRD peak top intensity value and the BET specific surface area of the composite tungsten oxide ultrafine particles can be controlled by predetermined production conditions, and specifically, can be controlled by appropriate setting of production conditions such as temperature (firing temperature), generation time (firing time), generation atmosphere (firing atmosphere), form of a precursor material at the time of generating the ultrafine particles by a thermal plasma method or a solid-phase reaction method, etc., and annealing after generation, doping of impurity elements. On the other hand, the content of the volatile component in the composite tungsten oxide ultrafine particles can be controlled by appropriate setting of production conditions such as a storage method and storage atmosphere of the ultrafine particles, temperature, drying time, a drying method when drying the ultrafine particle dispersion liquid. Note that the content of the volatile component in the composite tungsten oxide ultrafine particles does not depend on the crystal structure of the composite tungsten oxide ultrafine particles or a synthesis method such as a thermal plasma method or a solid phase reaction described later.

[b] Method for Synthesizing Composite Tungsten Oxide Ultrafine Particles

The method for synthesizing the composite tungsten oxide ultrafine particles according to the present invention will be described.

The method for synthesizing the composite tungsten oxide ultrafine particles according to the present invention includes a thermal plasma method for injecting a tungsten compound starting material into thermal plasma, and a solid-phase reaction method for applying heat treatment to the tungsten compound starting material in reducing gas atmosphere. The ultrafine composite tungsten oxide particles synthesized by the thermal plasma method or the solid-phase reaction method are subjected to a dispersion treatment or a pulverization/dispersion treatment.

Explanation will be given hereafter in the order of (1) Thermal plasma method, (2) Solid-phase reaction method, and (3) Synthesized composite tungsten oxide ultrafine particles.

(1) Thermal Plasma Method

Explanation will be given for the thermal plasma method in an order of (i) Raw material used for the thermal plasma method, (ii) Thermal plasma method and its conditions.

(i) Raw Material Used for the Thermal Plasma Method

When synthesizing the composite tungsten oxide ultrafine particles by the thermal plasma method, a mixed powder of the tungsten compound and the M element compound can be used as raw materials.

The tungsten compound is preferably one or more kinds selected from tungstic acid ($H_2WO_4$), ammonium tungstate, tungsten hexachloride, and tungsten hydrate obtained by adding water to the tungsten hexachloride which is dissolved in alcohol and hydrolyzed and then evaporating the solvent.

Further, as the M element compound, it is preferable to use at least one element selected from oxides, hydroxides, nitrates, sulfates, chlorides and carbonates of M element.

The above-described tungsten compound and the above-described aqueous solution containing M element compound, are wet-mixed so that the ratio of the M element to the W element is $M_xW_yO_z$ (wherein M is the M element, W is tungsten, O is oxygen, satisfying $0.001 \leq x/y \leq 1.0$, $2.0 \leq z/y \leq 3.0$). Then, by drying the obtained mixture liquid, a mixed powder of the M element compound and the tungsten compound is obtained. Then, the mixed powder can be used as a raw material for the thermal plasma method.

Further, the composite tungsten oxide obtained by first firing of the mixed powder in an inert gas alone or in a mixed gas atmosphere of the inert gas and a reducing gas, can also be used as a raw material for the thermal plasma method. Besides, the composite tungsten oxide obtained by two stage firing such as first firing of the mixed powder in the mixed gas atmosphere of the inert gas and the reducing gas, and a second firing of the first fired material in the inert gas atmosphere, can also be used as the raw material for the thermal plasma method.

(ii) Thermal Plasma Method and its Conditions

As the thermal plasma used in the present invention, for example, any one of DC arc plasma, high-frequency plasma, microwave plasma, low frequency alternating current plasma, or superimposed plasma of them, or plasma generated by an electric method for applying a magnetic field to direct current plasma, plasma generated by irradiation of a large output laser, and plasma generated by high power electron beam or ion beam, can be used. However, regardless of which thermal plasma is used, it is preferable to use thermal plasma having a high temperature part of 10000 to 15000 K, and particularly to use plasma capable of controlling the time for generating the ultrafine particles.

The raw material fed into the thermal plasma having a high temperature part is evaporated instantaneously in the high temperature part. Then, the evaporated raw material is condensed in the course of reaching a plasma tail flame part, and is rapidly solidified outside of the plasma flame, thereby producing the composite tungsten oxide ultrafine particles.

A synthesis method will be described with reference to FIG. 1 taking as an example a case of using a high-frequency plasma reaction device.

First, an inside of a reaction system constituted by an inside of a water-cooled quartz double tube and an inside of a reaction vessel 6 is evacuated to about 0.1 Pa (about 0.001 Torr) by a vacuum exhaust device. After evacuating the inside of the reaction system, this time the inside of the reaction system is filled with argon gas to make an argon gas flow system of 1 atm.

Thereafter, any gas selected from argon gas, mixed gas of argon and helium (Ar—He mixed gas), mixed gas of argon and nitrogen (Ar—$N_2$ mixed gas) is introduced into the reaction vessel as a plasma gas at a flow rate of 30 to 45 L/min. On the other hand, Ar—He mixed gas is introduced at a flow rate of 60 to 70 L/min, as the sheath gas to be flowed to immediately outside of the plasma region.

Then, an alternating current is applied to the high-frequency coil 2 to generate thermal plasma by a high-frequency electromagnetic field (frequency 4 MHz). At this time, high-frequency power is set to 30 to 40 kW.

Further, the mixed powder of the M element compound and the tungsten compound obtained by the above-described synthesis method, or a raw material of the composite tungsten oxide is introduced from the raw material powder feeding nozzle 5 into the thermal plasma at a feed rate of 25 to 50 g/min, using the argon gas of 6 to 98 L/min fed from a gas feeding device 11 as a carrier gas, and a reaction is caused for a predetermined time. After the reaction, the generated composite tungsten oxide ultrafine particles are deposited on a filter 8, and therefore the deposited particles are recovered.

The carrier gas flow rate and the raw material feed rate greatly affect the generation time of the ultrafine particles. Therefore, the carrier gas flow rate is preferably 6 L/min or more and 9 L/min or less and the raw material feed rate is preferably 25 to 50 g/min.

Further, the plasma gas flow rate is preferably 30 L/min or more and 45 L/min or less, and a sheath gas flow rate is preferably 60 L/min or more and 70 L/min or less. The plasma gas has a function of keeping a thermal plasma region having a high temperature part of 10000 to 15000 K, and the sheath gas has a function of cooling an inner wall surface of a quartz torch in the reaction vessel and preventing melting of the quartz torch. At the same time, the plasma gas and the sheath gas affect the shape of the plasma region, and therefore these gas flow rates are important parameters for shape control of the plasma region. As the plasma gas flow rate and the sheath gas flow rate are increased, the shape of the plasma region extends in a gas flow direction, and a temperature gradient of the plasma tail flame part becomes gentle, and therefore it becomes possible to lengthen the generation time of the ultrafine particles to be produced and to produce the ultrafine particles with high crystallinity. As a result, the XRD peak top intensity ratio value of the composite tungsten oxide ultrafine particles can be a predetermined value. On the contrary, as the plasma gas and sheath gas flow rates are reduced, the shape of the plasma region shrinks in a gas flow direction, and a temperature gradient in the plasma tail flame becomes steeper. Therefore, the generation time of the generated ultrafine particles can be shortened, and the ultrafine particles having a large BET specific surface area can be generated. Thereby, the XRD peak top intensity ratio value of the composite tungsten oxide ultrafine particles according to the present invention can be a predetermined value.

When the composite tungsten oxide obtained by synthesis using the thermal plasma method has a crystallite size exceeding 200 nm, or when the dispersed particle size of the composite tungsten oxide in the composite tungsten oxide ultrafine particle dispersion liquid obtained from the composite tungsten oxide obtained by the thermal plasma method exceeds 200 nm, the pulverization and dispersion treatment described later can be performed. When the composite tungsten oxide is synthesized by the thermal plasma method, the effect of the present invention is exhibited by appropriately selecting the conditions for the pulverization and dispersion treatment thereafter and setting the XRD peak top intensity ratio value to or more, thereby suppressing the difference between the average particle size and the crystallite size of the composite tungsten oxide ultrafine particles to 20% or less in the composite tungsten oxide ultrafine particle dispersion body of the coating layer of the composite tungsten oxide ultrafine particle dispersion liquid.

(2) Solid-Phase Reaction Method

The solid-phase reaction method will be described in an order of (i) Raw material used in the solid-phase reaction method, and (ii) Firing in the solid-phase reaction method and its conditions.

(i) Raw Material Used in the Solid-Phase Reaction Method

When synthesizing the composite tungsten oxide ultrafine particles according to the present invention by the solid-phase reaction method, a tungsten compound and an M element compound are used as the raw material.

The tungsten compound is preferably one or more kinds selected from tungstic acid ($H_2WO_4$), ammonium tungstate, tungsten hexachloride, and tungsten hydrate obtained by adding water to the tungsten hexachloride which is dissolved in alcohol and hydrolyzed, and then evaporating the solvent.

Further, the M element compound used for producing the raw material of the composite tungsten oxide ultrafine particles represented by the general formula $M_xW_yO_z$ (wherein M is an element of one or more kinds selected from Cs, Rb, K, Tl, Ba, satisfying $0.001 \le x/y \le 1$, $2.2 \le z/y \le 3.0$)

which is a more preferable embodiment, is preferably one or more kinds selected from oxides, hydroxides, nitrates, sulfates, chlorides, carbonates of M element.

Further, a compound containing an impurity element of one or more kinds selected from Si, Al, and Zr (sometimes referred to as "impurity element compound" in the present invention) may be contained in the composite tungsten oxide ultrafine particles as a raw material. The impurity element compound does not react with the composite tungsten compound in a subsequent firing step, and works to suppress a crystal growth of the composite tungsten oxide and prevent coarsening of the crystal. The compound containing the impurity element is preferably one or more kinds selected from oxides, hydroxides, nitrates, sulfates, chlorides, carbonates, and colloidal silica and colloidal alumina having a particle size of 500 nm or less are particularly preferable.

The above-described tungsten compound, the aqueous solution containing the M element compound, and the above-described impurity element compound are wet-mixed in such a manner that the ratio of the M element to the W element is the ratio of the M element to the W element in $M_xW_yO_z$ (M is the M element, W is tungsten, O is oxygen, satisfying $0.001 \leq x/y \leq 1.0$, $2.0 < z/y \leq 3.0$). When the impurity element compound is contained as a raw material, the impurity element compound is wet-mixed so as to be 0.5 mass % or less. Then, by drying the obtained mixed solution, the mixed powder of the M element compound and the tungsten compound, or the mixed powder of the M element compound containing the impurity element compound and the tungsten compound can be obtained.

(ii) Firing in the Solid-Phase Reaction Method and its Conditions

One-stage firing is performed to the mixed powder of the M element compound and the tungsten compound produced by the wet-mixing, or the mixed powder of the M element compound containing the impurity element compound and the tungsten compound, in the inert gas alone or mixed gas atmosphere of the inert gas and reducing gas. At this time, a firing temperature is preferably close to a temperature at which the composite tungsten oxide ultrafine particles start to crystallize. Specifically, the firing temperature is preferably in a temperature range of 1000° C. or less, more preferably 800° C. or less, still more preferably 800° C. or less and 500° C. or more. By controlling the firing temperature, the XRD peak top intensity ratio value of the composite tungsten oxide ultrafine particles of the present invention can be a predetermined value.

In synthesizing the composite tungsten oxide, tungsten trioxide may be used instead of the tungsten compound.

(3) Synthesized Composite Tungsten Oxide Ultrafine Particles

When the composite tungsten oxide ultrafine particle dispersion liquid described later are prepared by using the composite tungsten oxide ultrafine particles obtained by the synthesis method using the thermal plasma method or the solid-phase reaction method, the crystallite size of the ultrafine particles contained in the dispersion liquid exceeds 200 nm in some cases. In such a case, the pulverization and dispersion treatment may be performed to the composite tungsten oxide ultrafine particles in the step of producing the composite tungsten oxide ultrafine particle dispersion liquid described later. Then, if the XRD peak top intensity ratio value of the composite tungsten oxide ultrafine particles obtained through the pulverization and dispersion treatment is within a range of the present invention, the composite tungsten oxide ultrafine particle dispersion body obtained from the composite tungsten oxide ultrafine particles and the dispersion liquid thereof according to the present invention can exhibit excellent near infrared absorption properties.

[c] Volatile Component of the Composite Tungsten Oxide Ultrafine Particles and a Drying Treatment Method Therefore As described above, the composite tungsten oxide ultrafine particles of the present invention contain the volatile component in some cases, but the content of the volatile component is preferably 2.5 mass % or less. However, when the composite tungsten oxide ultrafine particles are exposed to the atmosphere or the like and the content of the volatile component exceeds 2.5 mass %, the content of the volatile component can be reduced by a drying treatment.

Specifically, the composite tungsten oxide synthesized by the above-described method is pulverized and dispersed to obtain finer particles, and the composite tungsten oxide ultrafine particles of the present invention can be produced through a step (pulverizing and dispersing step) of producing the composite tungsten oxide ultrafine particle dispersion liquid and a step of drying the composite tungsten oxide ultrafine particle dispersion liquid thus produced, and removing the solvent (drying step).

Regarding the pulverizing and dispersing step, in order to describe in detail in the "[d] Composite tungsten oxide ultrafine particle dispersion liquid" described later, the drying step will be described here.

The drying step is a step of applying drying treatment to the composite tungsten oxide ultrafine particle dispersion liquid obtained in the pulverizing and dispersing step described later, and removing the volatile component in the dispersion liquid, to thereby obtain the composite tungsten oxide ultrafine particles of the present invention.

As facilities for drying treatment, an air dryer, a universal mixer, a ribbon mixer, a vacuum flow drier, an oscillating fluid drier, a freeze dryer, a ribbon corn, a rotary kiln, a spray dryer, a pulverized dryer, and the like are preferable from a viewpoint that heating and/or decompression is possible and mixing and recovery of the ultrafine particles is easy, but the present invention is not limited thereto.

As an example thereof, (1) A drying treatment by the air dryer, (2) A drying treatment by the vacuum flow drier, and (3) A drying treatment by the spray dryer will be described hereafter. Each drying treatment will be sequentially described hereinafter.

(1) Drying Treatment by an Air Dryer

This is a treatment method for applying drying treatment to the composite tungsten oxide ultrafine particle dispersion liquid obtained by a method described later to remove the volatile component in the dispersion liquid by an air dryer. In this case, it is preferable to perform the drying treatment at a temperature higher than the temperature at which the volatile component volatilizes from the composite tungsten oxide ultrafine particles and the temperature at which the M element is not desorbed, and 150° C. or less is preferable.

The composite tungsten oxide ultrafine particles produced by the drying treatment using the air dryer are weak secondary aggregates. Even in this state, it is possible to disperse the composite tungsten oxide ultrafine particles in a resin or the like, but in order to make it easier to disperse, it is also a preferable example to disintegrate the ultrafine particles by a crusher or the like.

(2) Drying Treatment by a Vacuum Flow Dryer

This is a treatment method for removing the volatile component in the composite tungsten oxide ultrafine particle dispersion liquid by performing the drying treatment using the vacuum flow drier. In the vacuum flow drier, drying and disintegration treatments are performed at the same time under a reduced pressure atmosphere, and therefore in addition to a high drying rate, aggregates as seen in the above-described dried product in the air dryer are not formed. Further, because of drying in the reduced pressure atmosphere, the volatile component can be removed even at a relatively low temperature, and an amount of a residual volatile component can be minimized as well.

The drying temperature is preferably set so as to perform drying at a temperature at which the M element is not desorbed from the composite tungsten oxide ultrafine particles, and it is a temperature higher than a temperature at which the volatile component is volatilized, and it is desirably 150° C. or less.

(3) Drying Treatment by a Spray Dryer

This is a treatment method for removing the volatile component of the composite tungsten oxide ultrafine particle dispersion liquid by performing drying treatment using a spray dryer. In the spray dryer, secondary aggregation due to a surface force of the volatile component hardly occurs at the time of removing the volatile component in the drying treatment. Accordingly, the composite tungsten oxide ultrafine particles that are not relatively secondary aggregated can be obtained in some cases even without disintegration treatment.

By dispersing the composite tungsten oxide ultrafine particles subjected to the drying treatment according to the above (1) to (3) in the resin or the like by an appropriate method, it is possible to form the composite tungsten oxide ultrafine particle dispersion body, which is a near-infrared absorbing material ultrafine particle dispersion body having optical properties of a low haze value while having a high visible light transmittance and a low solar transmittance due to expression of a near infrared absorption function.

[d] Composite Tungsten Oxide Ultrafine Particle Dispersion Liquid

The composite tungsten oxide ultrafine particle dispersion liquid for producing the agricultural and horticultural covering film according to the present invention will be described.

The composite tungsten oxide ultrafine particle dispersion liquid is the liquid in which the ultrafine composite tungsten oxide particles obtained by the above synthesis method, water, organic solvent, liquid resin, liquid plasticizer for plastic, polymer monomer, or a liquid medium of a mixed slurry selected from these mixtures, and appropriate amount of dispersant, coupling agent, surfactant, etc., are pulverized and dispersed using a medium stirring mill.

The above composite tungsten oxide ultrafine particle dispersion liquid is characterized in that a dispersion state of the ultrafine particles in the solvent is good, and the dispersed particle size is 1 to 200 nm. Further, it is preferable that the content of the composite tungsten oxide ultrafine particles contained in the composite tungsten oxide ultrafine particle dispersion liquid is 0.01 mass % or more and 80 mass % or less.

Hereinafter, regarding the composite tungsten oxide ultrafine particle dispersion liquid according to the present invention, (1) Solvent, (2) Dispersant, (3) Dispersion method, (4) Dispersed particle size, (5) Binder, and other additives, will be described in this order.

(1) Solvent

A liquid solvent used in the composite tungsten oxide ultrafine particle dispersion liquid is not particularly limited, and may be selected suitably according to a coating condition, a coating environment of the composite tungsten oxide ultrafine particle dispersion liquid, and an inorganic binder and a resin binder added thereto suitably. For example, the liquid solvent is water, an organic solvent, an oil or fat, a liquid resin, a liquid plasticizer for a medium resin, a polymer monomer, or a mixture thereof.

Here, as the organic solvent, various solvents such as alcohols, ketones, hydrocarbons, glycols, and water can be selected. Specifically, alcoholic solvents such as methanol, ethanol, 1-propanol, isopropanol, butanol, pentanol, benzyl alcohol, diacetone alcohol; ketone solvents such as acetone, methyl ethyl ketone, methyl propyl ketone, methyl isobutyl ketone, cyclohexanone, isophorone; ester solvents such as 3-methyl-methoxy-propionate; ester solvents such as 3-methyl-methoxy-propionate; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate; amides such as formamide, N-methylformamide, dimethylformamide, dimethylacetamide, N-methyl-2-pyrrolidone; aromatic hydrocarbons such as toluene and xylene; ethylene chloride, chlorobenzene, etc., can be used. Among these organic solvents, dimethyl ketone, methyl ethyl ketone, methyl isobutyl ketone, toluene, propylene glycol monomethyl ether acetate, n-butyl acetate and the like are particularly preferable.

As fats and oils, vegetable fats or vegetable-derived fats and oils are preferable. As the vegetable oils, drying oils such as linseed oil, sunflower oil, and tung oil, semidrying oils such as sesame oil, cottonseed oil, rapeseed oil, soybean oil, rice bran oil, and the like, non-drying oils such as olive oil, coconut oil, palm oil, dehydrated castor oil, can be used. As the vegetable oil-derived compound, fatty acid monoesters obtained by direct esterification reaction of fatty acid of vegetable oil and monoalcohol and ethers are used. It can be selected according to the purpose of use. Further, commercially available petroleum solvents can also be used as fats and oils, including Isopar E, Exxol Hexane, Exol Heptane, Exol E, Exol D30, Exol D40, Exol D60, Exol D80, Exol D95, Exol D110, Exol D130 (all of them are manufactured by Exon Mobil Corporation), and the like can be used as examples.

As a liquid plasticizer for the medium resin, a known liquid plasticizer represented by an organic acid ester type, a phosphate ester type, or the like can be used.

This is because in the composite tungsten oxide ultrafine particle dispersion liquid used to produce the near-infrared absorbing ultrafine particle dispersion body with plasticity, the plasticity of the near-infrared absorbing ultrafine particle dispersion body can be improved by using the liquid plasticizer as a liquid medium.

Here, the liquid plasticizer includes: for example a plasticizer which is a compound of monohydric alcohol and organic acid ester, an ester-based plasticizer such as a polyhydric alcohol organic acid ester compound, and a phosphoric acid plasticizer such as an organic phosphoric acid plasticizer, each of which is preferably in a liquid state at room temperature. Among them, a plasticizer which is an ester compound synthesized from a polyhydric alcohol and a fatty acid is preferable.

The ester compound synthesized from polyhydric alcohol and fatty acid is not particularly limited, and includes for example, glycols such as triethylene glycol, tetraethylene glycol, and tripropylene glycol, a glycol ester compound obtained by a reaction between glycols such as triethylene glycol, tetraethylene glycol, tripropylene glycol, and monobasic organic acids such as butyric acid, isobutyric acid, caproic acid, 2-ethylbutyric acid, heptylic acid, n-octylic acid, 2-ethylhexylic acid, pelargonic acid (n-nonylic acid), and decylic acid, and also includes ester compounds of tetraethylene glycol and tripropylene glycol with the above-described monobasic organic compounds.

Among them, fatty acid esters of triethylene glycol such as triethylene glycol dihexanate, triethylene glycol di-2-ethyl butyrate, and triethylene glycol di-octanoate, triethylene glycol di-2-ethyl hexanonate, are suitable.

Further, a polymer monomer is a monomer that forms a polymer by polymerization or the like, and a preferable polymer monomer used in the present invention includes methyl methacrylate monomer, acrylate monomer, styrene resin monomer, etc.

The liquid solvents described above can be used alone or in combination of two or more. Further, if necessary, pH may be adjusted by adding acid or an alkali to these liquid solvents.

(2) Dispersant

Further, in order to further improve a dispersion stability of the composite tungsten oxide ultrafine particles in the composite tungsten oxide ultrafine particle dispersion liquid and to avoid the increase in the dispersed particle sized due to re-aggregation, it is also preferable to add various dispersants, surfactants, coupling agents, and the like. The dispersant, coupling agent, surfactant can be selected according to the application, but it is preferable that the compound has an amine-containing group, a hydroxyl group, a carboxyl group, or an epoxy group as functional groups. These functional groups have an effect of adsorbing on the surfaces of the composite tungsten oxide ultrafine particles to prevent aggregation and uniformly dispersing the composite tungsten oxide ultrafine particles of the present invention even in the infrared absorbing layer. A polymer dispersant having any of these functional groups in the molecule is more desirable.

Preferable specific examples of the commercially available dispersants include: SOLSPERSE3000, SOLSPERSE9000, SOLSPERSE11200, SOLSPERSE13000, SOLSPERSE13240, SOLSPERSE13650, SOLSPERSE13940, SOLSPERSE 16000, SOLSPERSE 17000, SOLSPERSE 18000, SOLSPERSE 20000, SOLSPERSE21000, SOLSPERSE24000SC, SOLSPERSE24000GR, SOLSPERSE26000, SOLSPERSE 27000, SOLSPERSE 28000, SOLSPERSE 31845, SOLSPERSE 32000, SOLSPERSE 32500, SOLSPERSE 32550, SOLSPERSE32600, SOLSPERSE33000, SOLSPERSE33500, SOLSPERSE34750, SOLSPERSE35100, SOLSPERSE35200, SOLSPERSE36600, SOLSPERSE37500, SOLSPERSE38500, SOLSPERSE39000, SOLSPERSE41000, SOLSPERSE41090, SOLSPERSE53095, SOLSPERSE55000, SOLSPERSE56000, SOLSPERSE76500, etc., produced by Japan Lubrizol Co., Ltd;

Disperbyk-101, Disperbyk-103, Disperbyk-107, Disperbyk-108, Disperbyk-109, Disperbyk-110, Disperbyk-111, Disperbyk-112, Disperbyk-116, Disperbyk-130, Disperbyk-140, Disperbyk-142, Disperbyk-145, Disperbyk-154, Disperbyk-161, Disperbyk-162, Disperbyk-163, Disperbyk-164, Disperbyk-165, Disperbyk-166, Disperbyk-167, Disperbyk-168, Disperbyk-170, Disperbyk-171, Disperbyk-174, Disperbyk-180, Disperbyk-181, Disperbyk-182, Disperbyk-183, Disperbyk-184, Disperbyk-185, Disperbyk-190, Disperbyk-2000, Disperbyk-2001, Disperbyk-2020, Disperbyk-2025, Disperbyk-2050, Disperbyk-2070, Disperbyk-2095, Disperbyk-2150, Disperbyk-2155, Anti-Terra-U, Anti-Terra-203, Anti-Terra-204, BYK-P104, BYK-P104S, BYK-220S, BYK-6919, etc., produced by Big Chemie Japan Co., Ltd.;

EFKA4008, EFKA4046, EFKA4047, EFKA4015, EFKA4020, EFKA4050, EFKA4055, EFKA4060, EFKA4080, EFKA4300, EFKA4330, EFKA4400, EFKA4401, EFKA4402, EFKA4403, EFKA4500, EFKA4510, EFKA4530, EFKA4550, EFKA4560, EFKA4585, EFKA4800, EFKA5220, EFKA6230, JONCRYL67, JONCRYL678, JONCRYL586, JONCRYL611, JONCRYL680, JONCRYL682, JONCRYL690, JONCRYL819, JONCRYL-JDX5050, etc., produced by BASF Japan Co., Ltd.

Addispar PB-711, Addispar PB-821, Addispar PB-822, etc., produced by Ajinomoto Fine Techno Co., Ltd.

(3) Dispersion Method

The near-infrared absorbing ultrafine particle dispersion body which is the composite tungsten oxide ultrafine particle dispersion body having the near infrared absorption properties of low haze value while having high visible light transmittance and low solar transmittance, can be formed by coating the surface of the substrate with the composite tungsten oxide ultrafine particles by an appropriate method, or by kneading the composite tungsten oxide ultrafine particles into the substrate.

The method for dispersing the composite tungsten oxide ultrafine particles in the dispersion liquid is not particularly limited as long as the fine particles can be uniformly dispersed in the dispersion liquid without aggregation. Examples of the dispersion method include a pulverization and dispersion treatment method using a device such as a bead mill, a ball mill, a sand mill, a paint shaker, an ultrasonic homogenizer, or the like. Among them, pulverization and dispersion with a medium stirring mill such as a bead mill, a ball mill, a sand mill, and a paint shaker using medium media such as beads, balls, and Ottawa sand, are preferable because the time required for obtaining a desired dispersed particle size is short. Through pulverization and dispersion treatment using these media stirring mills, formation of the fine particles is accelerated due to collision of the composite tungsten oxide ultrafine particles and collision of media against the ultrafine particles simultaneously with the dispersion of the composite tungsten oxide ultrafine particles in the dispersion liquid, and the composite tungsten oxide ultrafine particles can be more finely pulverized and dispersed (namely, they are pulverized and dispersed).

Then, step conditions for pulverization and dispersion are set, so that the XRD peak top intensity ratio of the composite tungsten oxide ultrafine particles can be ensured to 0.13 or more based on the XRD peak intensity value of 1 on the (220) plane of a silicon powder standard sample (640c, manufactured by NIST) when pulverizing and dispersing the composite tungsten oxide ultrafine particles. With this setting, the agricultural and horticultural covering film containing the composite tungsten oxide ultrafine particles exhibits excellent optical properties.

When dispersing the composite tungsten oxide ultrafine particles in the plasticizer, it is also preferable to add an organic solvent having a boiling point of 120° C. or less, if desired.

The organic solvent having the boiling point of 120° C. or less specifically includes toluene, methyl ethyl ketone, methyl isobutyl ketone, butyl acetate, isopropyl alcohol, and ethanol. However, the organic solvent can be arbitrarily selected, as long as the fine particles exhibiting a near-infrared absorption function at a boiling point of 120° C. or less can be uniformly dispersed. However, when the organic solvent is added, it is preferable that after the dispersion is completed, the drying step is performed, and an amount of the organic solvent remaining in the infrared absorbing layer described later as an example of the near infrared absorbing ultrafine particle dispersion body is 5 mass % or less. This is because when the residual solvent in the infrared absorbing layer is 5 mass % or less, no bubbles are generated in the agricultural and horticultural covering film described later, and the appearance and the optical properties are kept good.

(4) Dispersed Particle Size

The dispersed particle size of the composite tungsten oxide ultrafine particles is preferably 200 nm or less, and more preferably the dispersed particle size is 200 nm or less and 10 nm or more.

This is because in the case of the agricultural and horticultural covering film, when a white light reflecting layer is provided, it is necessary to consider the transparency of the visible light of the infrared absorbing layer visually, and the infrared absorbing layer is required to efficiently absorb the near-infrared rays while maintaining the transparency of the visible light.

The near-infrared absorbing component containing composite tungsten oxide ultrafine particles according to the present invention, absorb light in the near infrared region, especially around 900 to 2200 nm, and therefore in some cases, a transmission color tone of the visible light changes from blue to green. This is because when the dispersed particle size of the composite tungsten oxide ultrafine particles contained in the infrared ray absorbing layer is 1 to 200 nm, the light in the visible light region from 380 nm to 780 nm is not scattered due to geometric or Mie scattering. Therefore, coloration of the infrared absorbing layer due to light scattering is reduced and the visible light transmittance can be increased. Further, in a Rayleigh scattering region, the scattered light is reduced in proportion to the sixth power of the particle size, and therefore the scattering is reduced and the transparency is improved as the dispersed particle size is decreased. Therefore, when the dispersed particle size is 200 nm or less, the scattered light becomes very small, and the transparency is further increased, which is preferable.

As described above, when the dispersed particle size of the ultrafine particles is smaller than 200 nm, transparency can be ensured. However, when importance is placed on the transparency, the dispersed particle size is preferably 150 nm or less, more preferably 100 nm or less. On the other hand, when the dispersed particle size is 1 nm or more, industrial production is easy.

Here, the dispersed particle size of the composite tungsten oxide ultrafine particles in the composite tungsten oxide ultrafine particle dispersion liquid will be briefly described. The dispersed particle size of the composite tungsten oxide ultrafine particles means single particles of the composite tungsten oxide ultrafine particles dispersed in the solvent, and a particle size of aggregated particles obtained by aggregating the composite tungsten oxide ultrafine particles, and can be measured with various commercially available particle size distribution meters. For example, a sample of the composite tungsten oxide ultrafine particle dispersion liquid is collected, and the sample can be measured using ELS-8000 manufactured by Otsuka Electronics Co., Ltd. based on a dynamic light scattering method.

Further, the composite tungsten oxide ultrafine particle dispersion liquid in which the content of the composite tungsten oxide ultrafine particles obtained by the above synthesis method is 0.01 mass % or more and 80 mass % or less, has excellent liquid stability. When an appropriate liquid medium, dispersant, coupling agent, and surfactant are selected, no gelation of the dispersion liquid or sedimentation of particles occurs for 6 months or more even when placed in a constant temperature bath at a temperature of 40° C., and the dispersed particle size can be maintained in a range of 1 to 200 nm.

Note that there is sometimes a difference between the dispersed particle size of the composite tungsten oxide ultrafine particle dispersion liquid, and the average particle size of the composite tungsten oxide ultrafine particles dispersed in near-infrared absorbing material ultrafine particle dispersion body. This is because the aggregation of the composite tungsten oxide ultrafine particles is solved when processing from the composite tungsten oxide ultrafine particle dispersion liquid to the near-infrared absorbing material ultrafine particle dispersion body, even if the composite tungsten oxide ultrafine particles aggregate in the composite tungsten oxide ultrafine particle dispersion liquid.

(5) Binder, and Other Additives

The composite tungsten oxide ultrafine particle dispersion liquid may appropriately contain one or more selected from resin binders. The type of the resin binder contained in the composite tungsten oxide ultrafine particle dispersion liquid is not particularly limited, and a thermoplastic resin such as an acrylic resin, a thermosetting resin such as an epoxy resin, or the like can be used as the resin binder.

Further, in order to improve the near infrared absorption properties of the composite tungsten oxide ultrafine particle dispersion body according to the present invention, a boride represented by a general formula XBm (wherein X is a metal element selected from alkaline earth elements or rare earth elements including yttrium, satisfying 4≤m≤6.3), and near infrared absorbing ultrafine particles such as ATO and ITO may also be preferably added as needed, to the dispersion liquid according to the present invention. An addition ratio at this time may be appropriately selected according to desired near-infrared absorption properties.

Further, in order to adjust the color tone of the composite tungsten oxide ultrafine particle dispersion body, known inorganic pigments such as carbon black and red iron oxide and known organic pigments can also be added.

A known ultraviolet absorber, a known infrared absorber of an organic substance, or a phosphorus-based coloring inhibitor may be added to the composite tungsten oxide ultrafine particle dispersion liquid.

[e] Agricultural and Horticultural Covering Film

The agricultural and horticultural covering film according to the present invention will be described.

The sunlight that reaches the surface of the earth is generally said to be in a wavelength range of about 290 to 2100 nm, and above all, light in the visible light wavelength region of about 380 to 780 nm is the light necessary for growing plants. Accordingly, since the light in the visible light wavelength region having a wavelength of about 380 to 780 nm is reflected, and only the near infrared light having a wavelength of about 780 to 2100 nm is selectively and efficiently absorbed, the light necessary for the growth of the plant is reflected on the plant side, and the infrared light that becomes heat is absorbed to warm the soil. Then, when the agricultural and horticultural covering film is used in the greenhouse or the like, it is preferable to adopt a configuration in which the temperature of the atmosphere in the greenhouse or the like is not raised.

ここから

Specifically, the agricultural and horticultural covering film according to the present invention may have a configuration in which an infrared absorbing layer formed by being coated with infrared absorbing material ultrafine particles, is provided on at least one surface of the agricultural and horticultural covering film, and also may have a configuration in which the infrared absorbing material ultrafine particles are present in a dispersed state inside the agricultural and horticultural covering film.

Further, the agricultural and horticultural covering film according to the present invention may be provided with a white light reflecting layer in which a white light reflecting material is dispersed, or provided with an infrared absorbing layer formed by coating at least one surface of the film having the white reflecting layer with infrared absorbing material ultrafine particles.

Further, the white light reflecting material and the infrared absorbing material ultrafine particles may be dispersed in the film to form a white light reflecting layer and an infrared absorbing layer.

Further, a white light reflecting layer formed by coating with a white light reflecting material may be provided on one surface of the film, and an infrared absorbing layer formed by coating the white light reflecting layer with infrared absorbing material ultrafine particles may be further provided thereon.

Further, a white light reflecting layer formed by coating with a white light reflecting material may be provided on one surface of the film, and an infrared absorbing layer formed by coating with an infrared absorbing material ultrafine particles may be provided on the other surface of the film.

Note that in the agricultural and horticultural covering film according to the present invention, the infrared absorbing layer has no coloring caused by the infrared absorbing material ultrafine particles, and therefore even when the white reflecting layer is provided, the white reflecting layer is not colored by the infrared absorbing layer.

In the agricultural and horticultural covering film, by absorbing the solar heat of the sun by the infrared absorbing material ultrafine particles, the infrared rays are absorbed by the film and a film temperature rises, radiant heat also increases, and the temperature inside the covered soil rises quickly. Further, when the agricultural and horticultural covering film is used in a greenhouse or the like, the temperature of the atmosphere in the greenhouse or the like does not rise. Further, when the white light reflecting layer is provided in the agricultural and horticultural covering film, the visible light is reflected by the white light reflecting material, and therefore an increase in the amount of light that strikes the plant increases the amount of photosynthesis, thereby promoting plant growth.

As an application method for the infrared absorbing material ultrafine particles according to the present invention, there is a method for forming an infrared absorbing layer by coating with the fine particles on a desired substrate surface, the infrared absorbing layer having coated fine particles dispersed in a suitable medium. This method has an advantage such that application to substrates with low heat resistance such as resin materials is possible, at a low cost without a need for large-sized equipment during formation, because it is possible to knead the infrared-absorbing material ultrafine particles obtained by firing at a high temperature in advance into a film substrate or to bind it to the substrate surface with a binder.

As described above, when the infrared absorbing layer is formed by coating one surface of the film in which the white light reflecting material is dispersed inside the film, with the infrared absorbing material ultrafine particles, one surface of the film substrate is coated with a white light reflecting material to form a white light reflecting layer. Further, when the infrared absorbing layer is formed on the white light reflecting layer by coating with the infrared absorbing material ultrafine particles, or when one surface of the film substrate is coated with the white light reflecting material to form a white light reflecting layer, and the other surface is coated with the infrared absorbing material ultrafine particles to form an infrared absorbing layer, it becomes possible to form a thin film in which the infrared absorbing material ultrafine particles are dispersed in a medium, for example, by dispersing the infrared absorbing material ultrafine particles in a suitable solvent, adding a resin binder thereto, coating the film substrate surface with these infrared absorbing material ultrafine particles, then, evaporating the solvent and curing the resin by a predetermined method.

The method for coating the film substrate surface is not particularly limited as long as the film substrate surface can be uniformly coated with the infrared absorbing material ultrafine particle-containing resin, but the method includes, for example, bar coating, gravure coating, spray coating, dip coating, flow coating, spin coating, roll coating, screen printing, blade coating, etc. Further, the film substrate in which the infrared absorbing material ultrafine particles are directly dispersed in a binder resin does not need to evaporate the solvent after coating the surface of the film substrate, and is environmentally and industrially preferable.

As the resin binder, for example, a UV curable resin, a thermosetting resin, an electron beam curable resin, a room temperature curable resin, a thermoplastic resin, or the like can be selected according to the purpose.

The resin binder specifically includes: polyethylene resin, polyvinyl chloride resin, polyvinylidene chloride resin, polyvinyl alcohol resin, polystyrene resin, polypropylene resin, ethylene vinyl acetate copolymer, polyester resin, polyethylene terephthalate resin, fluororesin, polycarbonate resin, acrylic resin, and polyvinyl butyral resin. Further, it is also possible to use the binder using a metal alkoxide. As the metal alkoxide, alkoxides such as Si, Ti, Al, and Zr are representative. These binders using metal alkoxides can form oxide layers by hydrolysis and heating.

Further, as described above, the infrared absorbing material ultrafine particles may be dispersed inside the film substrate in which the white light reflecting material is dispersed. In order to disperse the ultrafine particles in the substrate, the ultrafine particles may be penetrated from the substrate surface, or the infrared absorbing material ultrafine particles and the base resin may be mixed after the temperature is raised to a temperature higher than a melting temperature of the substrate and the substrate is melted. Further, a masterbatch in which the ultrafine particles are preliminarily contained in the base resin material at a high concentration is produced, and the masterbatch may be diluted to a predetermined concentration. The infrared absorbing material ultrafine particle-containing resin thus obtained can be formed into a film shape by a predetermined method and applied as an infrared absorbing material.

The method for producing the master batch is not particularly limited, and a mixture in which the ultrafine particles are uniformly dispersed in a thermoplastic resin can be adjusted, by uniformly melting and mixing the composite tungsten oxide ultrafine particle dispersion liquid, thermoplastic resin powder or pellets, and other additives as necessary, using mixers such as ribbon blenders, tumblers, Nauta mixers, Henschel mixers, super mixers, planetary mixers, and kneading machines such as Banbury mixers, kneaders, rolls, kneader ruders, single-screw extruders, twin-screw extruders, while removing the solvent.

Further, it is also possible to prepare the mixture in which the ultrafine particles are uniformly dispersed in a thermoplastic resin, using the method for removing the solvent of the composite tungsten oxide ultrafine particle dispersion liquid by a known method, to uniformly melting and mixing the obtained powder and the thermoplastic resin powder or pellets and, if necessary, other additives. In addition, it is also possible to use a method for directly adding the powder of the composite tungsten oxide ultrafine particles to the thermoplastic resin, to uniformly melting and mixing the mixture.

The masterbatch containing heat ray absorbing components can be obtained, by kneading the mixture obtained by the method described above with a pent-type single-screw or twin-screw extruder, and processing it into pellets.

The method for dispersing the infrared absorbing material ultrafine particles in the resin is not particularly limited, and for example, ultrasonic dispersion, a medium stirring mill, a ball mill, a sand mill, or the like can be used.

A dispersion medium of the infrared absorbing material ultrafine particles is not particularly limited and can be selected according to a medium resin binder to be blended, and for example, various common organic solvents such as water, alcohols, ethers, esters, ketones, and aromatic compounds can be used. Further, if necessary, pH may be adjusted by adding an acid or an alkali. Further, in order to further improve the dispersion stability of the infrared absorbing material ultrafine particles, it is possible to add various surfactants, coupling agents and the like.

The white light reflecting material used in the agricultural and horticultural covering film according to the present invention is not particularly limited, and $TiO_2$, $ZrO_2$, $SiO_2$, $Al_2O_3$, MgO, ZnO, $CaCO_3$, $BaSO_4$, ZnS, $PbCO_3$ and the like are preferable. These white light reflecting materials may be used alone or in combination of two or more.

Further, the surface of the ultrafine particles constituting the infrared absorbing material used for the agricultural and horticultural covering film according to the present invention is coated with an oxide containing at least one selected from Si, Ti, Zr, and Al, which is preferable from a viewpoint of improving a weather resistance of the infrared absorbing material. These oxides are basically transparent, and do not lower the visible light transmittance when added. A coating method is not particularly limited, and by adding the metal alkoxide to the solution in which the infrared absorbing material ultrafine particles are dispersed, it is possible to coat the surface of the infrared absorbing material ultrafine particles.

The film used for the agricultural and horticultural covering film according to the present invention is not particularly limited, and for example, includes: polyethylene, polypropylene, polyethylene terephthalate, polyvinyl fluoride, polyvinylidene fluoride, polytetrafluoroethylene, tetrafluoroethylene-ethylene copolymer, polychlorotrifluoroethylene, tetrachlorotrifluoroethylene, polyvinyl chloride, polyvinylidene chloride, polyvinyl alcohol, polystyrene, ethylene vinyl acetate, and polyester resin. Additives such as a stabilizer, a stabilizing aid, an antioxidant, a plasticizer, a lubricant, and an ultraviolet absorber may be added to these resins.

Thus, the agricultural and horticultural covering film according to the present invention is a film having a white light reflecting layer containing a white light reflecting material, and an infrared absorbing layer containing infrared absorbing material ultrafine particles, and the present invention provides the agricultural and horticultural covering film having a good weather resistance, at a low cost, and capable of efficiently absorbing near-infrared rays from sunlight with a small amount of ultrafine particles and reflecting visible light, by forming an infrared. absorbing layer containing infrared absorbing material ultrafine particles, preferably composite tungsten oxide ultrafine particles, using a simple method.

By using this film on the ground where plants are grown, there is an effect of raising the temperature of the covered ground and warming the soil, and when the agricultural and horticultural covering film is used in a greenhouse or the like, there is an effect of not raising the temperature of the atmosphere such as the greenhouse.

Further, when the agricultural and horticultural covering film is provided with the white light reflecting layer, the visible light is reflected by the white light reflecting material, and therefore the amount of photosynthesis increases due to increase of the amount of light that strikes the plant, and plant growth can be promoted.

EXAMPLES

Hereinafter, the present invention will be specifically described with reference to examples. However, the present invention is not limited to the examples described below.

Note that the optical properties of the dispersion liquid and the coating layer in the examples and comparative examples were measured using a spectrophotometer (U-4100, manufactured by Hitachi, Ltd.), and the visible light transmittance and the solar transmittance were measured according to JIS R 3106. Further, the dispersed particle size was shown by an average value measured by a particle size measuring device (ELS-8000 manufactured by Otsuka Electronics Co., Ltd.) based on a dynamic light scattering method as a principle.

Further, the content of the volatile component of the composite tungsten oxide ultrafine particles of example 1 was measured using a moisture meter (MOC 63u, manufactured by Shimadzu Corporation), and the temperature was raised from room temperature to 125° C. for 1 minute from start of the measurement, held at 125° C. for 9 minutes, and a weight reduction rate after 10 minutes from the start of the measurement was taken as the content of the volatile component. The average particle size of the composite tungsten oxide ultrafine particles dispersed in the infrared absorbing layer was measured by observing a transmission electron microscope image of a cross section of the absorbing layer.

The transmission electron microscope image was observed using a transmission electron microscope (HF-2200 manufactured by Hitachi High-Technologies Corporation). The transmission electron microscope image was processed by an image processing device, and the particle sizes of 100 composite tungsten oxide ultrafine particles were measured, and an average value thereof was defined as an average particle size.

An X-ray diffraction pattern was measured by a powder X-ray diffraction method (θ-2θ method) using a powder X-ray diffractometer (X'Pert-PRO/MPD manufactured by Spectris Co., Ltd. PANalytical). Further, in order to ensure objective quantification, every time the X-ray diffraction pattern of the composite tungsten oxide ultrafine particles was measured, the X-ray diffraction pattern of a silicon powder standard sample was measured, and the value of the peak intensity ratio was calculated each time.

Example 1

0.216 kg of $Cs_2CO_3$ was dissolved in 0.330 kg of water, which was then added to 1.000 kg of $H_2WO_4$, sufficiently stirred, and then dried to obtain a mixed powder of $Cs_{0.33}WO_3$ as a target composition.

Next, the high-frequency plasma reaction device described in FIG. 1 was used, and the inside of the reaction system was evacuated to about 0.1 Pa (about 0.001 Torr) by a vacuum evacuation device, and then the inside of the reaction system was completely replaced with argon gas to obtain a flow system of 1 atm. Thereafter, argon gas was introduced as a plasma gas into the reaction vessel at a flow rate of 30 L/min, and the argon gas and a helium gas were introduced as a sheath gas from a sheath gas feed port at a flow rate of 55 L/min of argon gas and 5 L/min of helium gas. Then, high-frequency power was applied to a water cooled copper coil for generating high-frequency plasma, to generate high-frequency plasma. At this time, in order to generate thermal plasma having a high temperature part of 10000 to 15000 K, the high-frequency power was set to 40 kW.

In this way, after generating the high-frequency plasma, the mixed powder was supplied into the thermal plasma at a rate of 50 g/min while feeding the argon gas as a carrier gas at a flow rate of 9 L/min from the gas feeding device 11.

As a result, the mixed powder was instantaneously evaporated in the thermal plasma, and rapidly solidified in a process of reaching the plasma tail flame part, resulting in ultrafine particles. The generated ultrafine particles of example 1 before pulverization were deposited on a recovery filter.

Table 1 shows the manufacturing conditions. Table 1 also shows production conditions of examples 2 to 13 described below.

The deposited ultrafine particles were recovered, and the X-ray diffraction pattern was measured by a powder X-ray diffraction method (θ-2θ method) using a powder X-ray diffractometer (X Pert-PRO/MPD manufactured by SPECTALIS Corporation).

Figure 2:
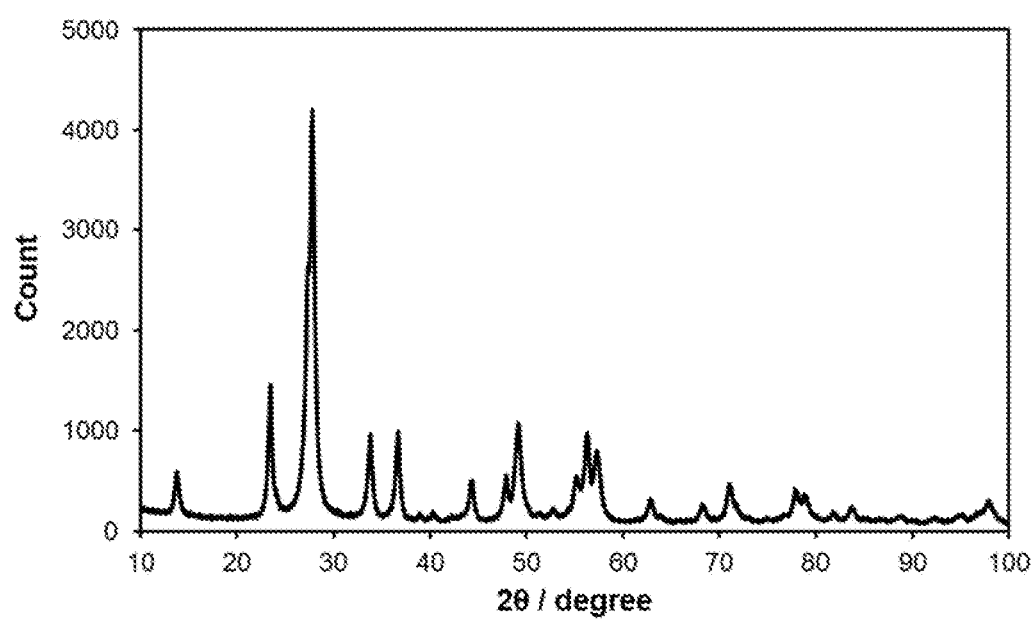
FIG. 2 is an X-ray diffraction pattern of the ultrafine particles according to example 1.

FIG. 2 shows an X-ray diffraction pattern of the obtained ultrafine particles. As a result of phase identification, the obtained ultrafine particles were identified as a hexagonal $Cs_{0.33}WO_3$ single phase. Further, when crystal structure analysis by the Rietveld analysis method was performed using the X-ray diffraction pattern, the crystallite size of each obtained ultrafine particles was 18.8 nm. Further, the peak top intensity value of the X-ray diffraction pattern of the obtained ultrafine particles before pulverization was 4200 counts.

The composition of the obtained ultrafine particles before pulverization was examined by ICP emission spectrometry. As a result, Cs concentration was 13.6 mass %, W concentration was 65.3 mass %, and a molar ratio of Cs/W was 0.29. It was confirmed that a remained part other than Cs and W was oxygen and no other impurity element contained in an amount of 1 mass % or more was present.

When a BET specific surface area of the obtained ultrafine particles before pulverization was measured using a BET specific surface area measuring device (HM model 1208 manufactured by Mountech), it was 60.0 $m^2$/g. Note that nitrogen gas having a purity of 99.9% was used for measurement of the BET specific surface area.

Further, the content of the volatile component of the composite tungsten oxide ultrafine particles of example 1 was measured, it was found to be 1.6 mass %.

10 parts by weight of the obtained composite tungsten oxide ultrafine particles, 80 parts by weight of toluene, and 10 parts by weight of an acrylic polymer dispersant having an amine-containing group as a functional group (acrylic dispersant having an amine value of 48 mgKOH/g and a decomposition temperature of 250° C.) (hereinafter referred to as "dispersant a") were mixed, to prepare 3 kg of slurry.

This slurry was put into a medium stirring mill together with beads, and pulverized and dispersed for half an hour. As the medium stirring mill, a horizontal cylindrical annular type (manufactured by Ashizawa Co., Ltd.) was used, and zirconia was used for the inner wall of the vessel and the rotor (rotary stirring portion). Further, beads made of YSZ (Yttria-Stabilized Zirconia) having a diameter of 0.1 mm were used as the beads. A rotational speed of the rotor was 14 rpm/second, and a pulverization and dispersion treatment were performed at a slurry flow rate of 0.5 kg/min, to obtain the composite tungsten oxide ultrafine particle dispersion liquid of example 1.

The peak top intensity value of X-ray diffraction pattern of the composite tungsten oxide ultrafine particles contained in the composite tungsten oxide ultrafine particle dispersion liquid of example 1, that is, the composite tungsten oxide ultrafine particles after the pulverization and dispersion treatment was measured, and it was found to be 3000 counts, and the peak position was found to be 2θ=27.8°.

On the other hand, a silicon powder standard sample (produced by NIST, 640c) was prepared and the peak intensity value based on (220) plane of the silicon powder standard sample as a reference was measured, and it was found to be 19800 counts.

Accordingly, the XRD peak intensity ratio value of the composite tungsten oxide ultrafine particles was found to be 0.15 after the pulverization and dispersion treatment of example 1, based on the peak intensity value of 1 of the standard sample.

Further, the crystallite size of each composite tungsten oxide ultrafine particle of example 1 after the pulverization and dispersion treatment was 16.9 nm.

The dispersed particle size of the composite tungsten oxide ultrafine particle dispersion liquid of example 1 was measured using a particle size analyzer based on the dynamic light scattering method, and it was found to be 70 nm. As the setting of the dispersed particle size measurement, a particle refractive index was set to 1.81, and a particle shape was set as non-spherical. The background was measured with toluene and the solvent refractive index was set to 1.50.

Table 3 shows the results. Table 3 also shows the results obtained in examples 2 to 13 below.

50 parts by weight of the composite tungsten oxide ultrafine particle dispersion liquid according to example 1 and 30 parts by weight of an ultraviolet-curable resin for hard coating (solid content: 100%) were mixed, to obtain an infrared absorbing material ultrafine particle dispersion liquid. This infrared absorbing material ultrafine particle dispersion liquid was applied on a polyethylene film containing $TiO_2$ fine particles as a white light reflecting material using a bar coater to form a layer. This layer was dried at 60° C. for 30 seconds to evaporate the solvent, and then cured by a high-pressure mercury lamp to obtain an infrared absorbing layer according to example 1 having a high diffuse reflectance in the visible light region.

The average particle size of the composite tungsten oxide ultrafine particles dispersed in the infrared absorbing layer of example 1 was calculated by an image processing apparatus using a transmission electron microscopic image, and it was found to be 17 nm which was almost the same as the above-described crystallite size of 16.9 nm.

Further, spectral properties of the prepared layer were measured by using a spectrophotometer manufactured by Hitachi, Ltd. based on the transmittance of light having a wavelength of 200 to 2600 nm, and the visible light transmittance, the solar transmittance, the visible light reflectance, the solar reflectance, and the solar absorptance were calculated, according to JIS A 5759. (Here, the solar absorptance was calculated from solar absorptance (%)=100%−solar transmittance (%)−solar reflectance (%).).

Table 5 shows the results. Table 5 also shows the results obtained in examples 2 to 13 described below.

Examples 2 to 6

The composite tungsten oxide ultrafine particles and the composite tungsten oxide ultrafine particle dispersion liquid according to examples 2 to 6 were produced in the same manner as in the example 1, except that the carrier gas flow rate, the plasma gas flow rate, the sheath gas flow rate, and the raw material feed rate were changed. Table 1 shows the changed carrier gas flow rate condition, material feed rate condition, and other conditions. Evaluations similar to those of example 1 were performed for the composite tungsten oxide ultrafine particles and the composite tungsten oxide ultrafine particle dispersion liquid of examples 2 to 6. Table 2 shows the evaluation results.

Further, infrared absorbing layers according to examples 2 to 6 were obtained and evaluated in the same manner as in example 1 except that the composite tungsten oxide ultrafine particle dispersion liquid according to examples 2 to 6 were used.

Tables 1, 3, and 5 show the results.

Examples 7

The mixed powder of $Cs_2CO_3$ and $H_2WO_4$ described in example 1 was changed to the composite tungsten oxide represented by $Cs_{0.33}WO_3$ fired at 800° C. under a mixed gas atmosphere of nitrogen gas and hydrogen gas, and was used as a raw material to be charged into a high-frequency plasma reactor. The composite tungsten oxide ultrafine particles and the composite tungsten oxide ultrafine particle dispersion liquid according to example 7 were produced in the same manner as in the example 1 except for the above. Evaluations similar to those of examples 1 to 6 were performed for the obtained ultrafine particles and the dispersion liquid thereof. Tables 1 and 2 show the production conditions and evaluation results.

Further, an infrared absorbing layer according to example 7 was obtained and evaluated in the same manner as in example 1 except that the composite tungsten oxide ultrafine particle dispersion liquid of example 7 was used.

Tables 1, 3, 5 show the results.

Examples 8

The composite tungsten oxide ultrafine particles and the composite tungsten oxide ultrafine particle dispersion liquid according to example 8 were produced in the same manner as in example 7 except that the carrier gas flow rate and the raw material feed rate were changed. Evaluation similar to those of example 1 was performed for the obtained ultrafine particles and the dispersion liquid thereof. Tables 1 and 2 show the production conditions and evaluation results.

Further, an infrared absorbing layer according to example 8 was obtained and evaluated in the same manner as in example 1 except that the composite tungsten oxide ultrafine particle dispersion liquid of example 8 was used.

Tables 1, 3, 5 show the results.

Examples 9 to 13

0.148 kg of $Rb_2CO_3$ was dissolved in 0.330 kg of water, added to 1.000 kg of $H_2WO_4$, sufficiently stirred, and then dried to obtain a mixed powder of $Rb_{0.32}WO_3$ of example 9 as a target composition.

0.375 kg of $K_2CO_3$ was dissolved in 0.330 kg of water, added to 1.000 kg of $H_2WO_4$, sufficiently stirred, and then dried to obtain a mixed powder of $K_{0.27}WO_3$ of example 10 as a target composition.

0.320 kg of $TlNO_3$ was dissolved in 0.330 kg of water, added to 1.000 kg of $H_2WO_4$, sufficiently stirred, and then dried to obtain a mixed powder of $Tl_{0.19}WO_3$ of example 11 as a target composition.

0.111 kg of $BaCO_3$ was dissolved in 0.330 kg of water, added to 1.000 kg of $H_2WO_4$, sufficiently stirred, and then dried to obtain a mixed powder of $Ba_{0.14}WO_3$ of example 12 as a target composition.

0.0663 kg of $K_2CO_3$ and 0.0978 kg of $Cs_2CO_3$ were dissolved in 0.330 kg of water, added to 1.000 kg of $H_2WO_4$, sufficiently stirred, and then dried to obtain a mixed powder of $K_{0.24}Cs_{0.15}WO_3$ of example 13 as a target composition.

The composite tungsten oxide ultrafine particles and the composite tungsten oxide ultrafine particle dispersion liquid according to examples 9 to 13 were produced in the same manner as in example 1, except that the mixed powder of examples 9 to 13 was used as the raw material to be charged into the high-frequency thermal plasma reactor. Evaluations similar to those of examples 1 to 12 were performed for the obtained ultrafine particles and the dispersion liquid thereof. Tables 1 and 2 show the production conditions and evaluation results.

Further, infrared absorbing layers according to examples 9 to 13 were obtained and evaluated in the same manner as in example 1 except that the composite tungsten oxide ultrafine particle dispersion liquid of examples 9 to 13 was used.

Tables 1, 3, and 5 show the results.

Example 14

10.8 g of $Cs_2CO_3$ was dissolved in 16.5 g of water, the solution was added to 50 g of $H_2WO_4$, sufficiently stirred, and then dried. While feeding 2% $H_2$ gas with $N_2$ gas as a carrier, the dried product was heated, and fired at a temperature of 800° C. for 30 minutes. Thereafter, the composite tungsten oxide according to example 14 was obtained by a solid-phase reaction method of firing at 800° C. for 90 minutes under an $N_2$ gas atmosphere.

In the same manner as in example 1 except for the above matter, the composite tungsten oxide ultrafine particle dispersion liquid according to example 14 was produced. The pulverization/dispersion treatment time by the medium stirring mill was set to 2 hours. The obtained ultrafine particles and the dispersion liquid thereof were evaluated in the same manner as in example 1.

As a result of phase identification, the obtained ultrafine particles were identified as a hexagonal $Cs_{0.33}WO_3$ single phase.

Table 2 shows the production conditions. Table 2 also shows the production conditions of the examples 15 to 26 and comparative examples 1 to 4 described below.

Table 4 shows the evaluation results. table 4 also shows the results obtained in the examples 15 to 26 and comparative examples 1 to 4 described below.

Further, the infrared absorbing layer according to example 14 was obtained and evaluated in the same manner as in example 1, except that the dispersion liquid of the composite tungsten oxide ultrafine particles of example 14 was used.

Table 6 shows the evaluation results. Table 6 also shows the results obtained in examples 15 to 26 and comparative examples 1 to 5 described below.

Example 15 kg of $Cs_2CO_3$ was dissolved in 0.330 kg of water, which was then added to 1.000 kg of $H_2WO_4$, sufficiently stirred, and then dried to obtain a mixed powder of $Cs_{0.33}WO_3$ as a target composition. While feeding 5% $H_2$ gas with $N_2$ gas as a carrier, the dried product was heated, and fired at a temperature of 800° C. for 1 hour. Thereafter, the solid-phase reaction method was performed, which is the method of further firing the dried product at 800° C. in the $N_2$ gas atmosphere for 2 hours, to obtain the composite tungsten oxide according to example 15.

10 parts by weight of the obtained composite tungsten oxide of example 15 and 90 parts by weight of water were mixed to prepare a slurry of about 3 kg. Note that no dispersant was added to this slurry. The slurry was put into a medium stirring mill together with beads, and pulverized and dispersed for 2 hours. Note that as the medium stirring mill, a horizontal cylindrical annular type (manufactured by Ashizawa Co., Ltd.) was used, and zirconia was used for an inner wall of a vessel and a rotor (rotary stirring portion). Further, beads made of YSZ (Yttria-Stabilized Zirconia) having a diameter of 0.1 mm were used as the beads. A rotational speed of the rotor was 14 rpm/second, and a pulverization and dispersion treatment were performed at a slurry flow rate of 0.5 kg/min, to obtain the composite tungsten oxide ultrafine particle dispersion aqueous liquid according to example 15.

The dispersed particle size of the aqueous dispersion liquid of the composite tungsten oxide ultrafine particles of example 15 was measured, and it was found to be 70 nm. Note that as a setting for measuring the dispersed particle size, a particle refractive index was set to 1.81, and a particle shape was set to non-spherical. Further, the background was measured with water and a solvent refractive index was set to 1.33.

Next, about 3 kg of the obtained composite tungsten oxide ultrafine particle dispersion liquid was dried in an air dryer, to obtain the composite tungsten oxide ultrafine particles according to example 15. Note that for the air dryer, a thermostatic oven SPH-201 type (manufactured by Espec Corporation) was used, a drying temperature was set to 70° C., and a drying time was set to 96 hours.

The X-ray diffraction pattern of the composite tungsten oxide ultrafine particles of example 15 was measured and a phase was identified, and as a result, the obtained ultrafine particles were identified as having a hexagonal $Cs_{0.33}WO_3$ single phase. Further, in the X-ray diffraction pattern of the obtained ultrafine particles, the peak top intensity value was 4200 counts, the peak position was 2θ=27.8°, and the crystallite size was 23.7 nm. On the other hand, a silicon powder standard sample (manufactured by NIST, 640c) was prepared and the peak intensity value was measured, based on plane (220) of the silicon powder standard sample as a reference, and it was found to be 19,800 counts. Accordingly, it was found that the XRD peak intensity ratio value of the composite tungsten oxide ultrafine particles of example 15 was 0.21 after the pulverization and dispersion treatment, based on the peak intensity value of 1 of the standard sample.

The composition of the obtained composite tungsten oxide ultrafine particles of example 15 was examined by ICP emission spectrometry. As a result, Cs concentration was 15.2 mass %, W concentration was 64.6 mass %, and the molar ratio of Cs/W was 0.33. It was confirmed that a balance other than Cs and W was oxygen and no other impurity element contained by 1 mass % or more was present.

The BET specific surface area of the composite tungsten oxide ultrafine particles of example 15 obtained by pulverization was measured, and it was found to be 42.6 $m^2/g$.

Further, the content of the volatile component of the composite tungsten oxide ultrafine particles of example 15 was measured, and it was found to be 2.2 mass %.

10 parts by weight of the obtained composite tungsten oxide ultrafine particles were dispersed in 80 parts by weight of toluene as a solvent and 10 parts by weight of a dispersant a to prepare a dispersion liquid of 50 g, and the dispersed particle size of the dispersion liquid was measured, and it was found to be 80 nm Note that as a setting for measuring the particle size, the particle refractive index was set to 1.81, and the particle shape was set as non-spherical. Further, the measurement was performed after dilution with toluene, and the solvent refractive index was 1.50.

50 parts by weight of the composite tungsten oxide ultrafine particle dispersion liquid of example 15 and 30 parts by weight of an ultraviolet-curable resin for hard coating (solid content: 100%) were mixed, to obtain an infrared absorbing material ultrafine particle dispersion liquid. This infrared absorbing material ultrafine particle dispersion liquid was applied on the surface of a polyethylene film containing $TiO_2$ fine particles as a white light reflecting material using a bar coater, to form a layer. This layer was dried at 60° C. for 30 seconds to evaporate the solvent, then, the layer was cured with a high-pressure mercury lamp, to obtain the infrared absorbing layer according to example 1 having high diffuse reflectance in the visible light region.

The average particle size of the composite tungsten oxide ultrafine particles dispersed in the prepared infrared absorbing layer of example 15 was calculated by an image processing apparatus using a transmission electron microscope image, and it was found to be 23 nm which was almost the same as the above-described crystallite size of 23.7 nm.

The spectral properties of the prepared layer were measured using a spectrophotometer manufactured by Hitachi, Ltd. based on the transmittance of light having a wavelength of 200 to 2100 nm, and the visible light transmittance, the solar transmittance, the visible light reflectance, the solar reflectance, and the solar absorptance were calculated according to JIS A 5759. (Here, the solar absorptance was calculated from solar absorptance (%)=100%−solar transmittance (%)−solar reflectance (%).)

Tables 2, 4, and 6 show the results.

Example 16

The infrared absorbing layer according to example 16 was obtained and evaluated in the same manner as in example 15 except that the drying treatment by the air dryer was changed to a vacuum drying treatment by a vacuum stirring crusher.

Tables 2, 4, and 6 show the results.

Note that an Ishikawa-type stirring crusher 24P model (manufactured by Tajima Chemical Machinery Co., Ltd.)

was used as the vacuum stirring crusher, and the drying temperature in the vacuum drying treatment was 80° C., the drying time was 32 hours, the rotation frequency of the kneading mixer was 40 Hz, and the pressure in the vacuum vessel was 0.001 MPa or less.

Example 17

An infrared absorbing layer according to example 17 was obtained and evaluated in the same manner as in example 15 except that the drying process using the air dryer was changed to a spray drying process using a spray dryer.

Tables 2, 4, and 6 show the results.

Note that the spray dryer used was ODL-20 spray dryer (manufactured by Okawara Kakoki Co., Ltd.).

Examples 18 to 20

Infrared absorbing layers according to examples 18 to 20 were obtained and evaluated in the same manner as in examples 15 to 17 except that the pulverization and dispersion treatment time by the medium stirring mill was changed to 1 hour.

Tables 2, 4, and 6 show the results.

Examples 21 to 23

Infrared absorbing layers according to examples 21 to 23 were obtained and evaluated by the same synthetic production method as in examples 15 to 17 described above except that 10 parts by weight of the composite tungsten oxide and 90 parts by weight of propylene glycol monoethyl ether were mixed as a solvent.

Tables 2, 4, and 6 show the results.

Example 24

The composite tungsten oxide ultrafine particles were obtained in the same manner as in example 1. Thereafter, 10 parts by weight of the obtained ultrafine particles, 80 parts by weight of toluene, and 10 parts by weight of dispersant a were mixed to prepare 50 g of slurry. The slurry was subjected to dispersion treatment for 0.5 hours with an ultrasonic homogenizer (US-600TCVP, manufactured by Nippon Seiki Seisakusho Co., Ltd.) to obtain the composite tungsten oxide ultrafine particle dispersion liquid according to example 24, and further obtain and evaluate the infrared absorbing layer of example 24 in the same manner as in example 1.

Tables 2, 4, and 6 show the results.

Example 25

Toluene was removed from the composite tungsten oxide ultrafine particle dispersion liquid of example 1 using the spray dryer, to obtain composite tungsten oxide ultrafine particle dispersion powder according to example 25.

The obtained composite tungsten oxide ultrafine particle dispersion powder was added to polyethylene resin pellets, and uniformly mixed by a blender, and thereafter melted and kneaded with a twin screw extruder, and the extruded strands are cut into pellets, to obtain a masterbatch containing the composite tungsten oxide ultrafine particles.

A masterbatch containing $TiO_2$ was obtained by the same method.

The masterbatch containing the composite tungsten oxide ultrafine particles and the masterbatch containing $TiO_2$, were mixed with a masterbatch prepared by the same method without adding inorganic fine particles. This mixed masterbatch was extruded to form a 50 μm thick film.

Tables 2, 4, and 6 show the results.

Example 26

50 parts by weight of the composite tungsten oxide ultrafine particle dispersion liquid of example 1 and 30 parts by weight of an ultraviolet-curable resin for hard coating (solid content: 100%) were mixed, to obtain an infrared absorbing material ultrafine particle dispersion liquid. This infrared absorbing material ultrafine particle dispersion liquid was applied on the surface of a polyethylene film using a bar coater, to form a layer. This layer was dried at 60° C. for 30 seconds to evaporate the solvent, and cured with a high-pressure mercury lamp. Thereafter, the other surface of the polyethylene film was coated with white light reflecting material fine particles to form a layer, and cured, to obtain an infrared absorbing layer with high diffuse reflectance in the visible light region in the same manner as above.

Tables 2, 4, and 6 show the results.

Comparative Examples 1 to 2

Infrared absorbing layers according to comparative examples 1 and 2 were obtained and evaluated in the same manner as in example 1 except that the carrier gas flow rate, the plasma gas flow rate, the sheath gas flow rate, and the raw material feed rate were changed.

Tables 2, 4, and 6 show the results.

Comparative Examples 3

In order to generate thermal plasma having a high temperature part of 5000 to 10000K, an infrared absorbing layer according to comparative example 3 was obtained and evaluated in the same manner as in example 1 except that the high frequency power was 15 kW.

Tables 2, 4, and 6 show the results.

Comparative Examples 4

A composite tungsten oxide ultrafine particle aqueous dispersion liquid according to comparative example 4 was obtained by performing the same operation as in example 15, except that the composite tungsten oxide ultrafine particle aqueous dispersion liquid was obtained by 20 hours pulverization dispersion treatment instead of 2 hours pulverization dispersion treatment. The dispersed particle size of the composite tungsten oxide ultrafine particle aqueous dispersion liquid of comparative example 4 was measured, and it was found to be 120 nm. Note that as the setting for measuring the dispersed particle size, the particle refractive index was set to 1.81, and the particle shape was set non-spherical. Further, the background was measured with water and the solvent refractive index was set to 1.33.

The X-ray diffraction pattern of the composite tungsten oxide ultrafine particles of comparative example 4 was measured and a phase was identified, and as a result, the obtained ultrafine particles were identified as having a hexagonal $Cs_{0.33}WO_3$ single phase. Further, in the X-ray diffraction pattern of the obtained ultrafine particles, the peak top intensity value was 1300 counts, the peak position was $2\theta=27.8°$, and the crystallite size was 8.1 nm. On the other hand, a silicon powder standard sample (manufactured by NIST, 640c) was prepared and the peak intensity value was measured, based on plane (220) of the silicon powder standard sample as a reference, and it was found to be 19,800 counts. Accordingly, it was found that the XRD peak intensity ratio value of the composite tungsten oxide ultrafine particles of example 1 was 0.07 after the pulverization and dispersion treatment, based on the peak intensity value of 1 of the standard sample.

The BET specific surface area of the composite tungsten oxide ultrafine particles of comparative example 4 obtained by pulverization was measured, and it was found to be 102.8 $m^2/g$.

Further, the content of the volatile component in the composite tungsten oxide ultrafine particles of comparative example 4 was measured, and it was found to be 2.2 mass %.

10 parts by weight of the obtained composite tungsten oxide ultrafine particles were dispersed in 80 parts by weight of toluene as a solvent and 10 parts by weight of a dispersant a to prepare a composite tungsten oxide ultrafine particle dispersion liquid of 50 g according to comparative example 4. Then, the dispersed particle size of the composite tungsten oxide ultrafine particle dispersion liquid was measured, and it was found to be 120 nm. Note that as a setting for measuring the dispersed particle size, the particle refractive index was set to 1.81, and the particle shape was set as non-spherical. Note that, the background was measured with toluene and the solvent refractive index was set to 1.50.

50 parts by weight of the composite tungsten oxide ultrafine particle dispersion liquid of comparative example 4 and 30 parts by weight of an ultraviolet-curable resin for hard coating (solid content: 100%) were mixed, to obtain an infrared absorbing material ultrafine particle dispersion liquid. This infrared absorbing material ultrafine particle dispersion liquid was applied on the surface of a polyethylene film using a bar coater, to form a layer. This layer was dried at 60° C. for 30 seconds to evaporate the solvent, then, cured with a high-pressure mercury lamp, to obtain the infrared absorbing layer according to comparative example 4.

The average particle size of the composite tungsten oxide ultrafine particles dispersed in the infrared absorbing layer of comparative example 4 was calculated by an image processing apparatus using a transmission electron microscope image, and it was found to be 120 nm, and the value was different from the crystallite size of 8.1 nm described above.

The spectral properties of the prepared layer were measured using a spectrophotometer manufactured by Hitachi, Ltd. based on the transmittance of light having a wavelength of 200 to 2100 nm, and the visible light transmittance, the solar transmittance, the visible light reflectance, the solar reflectance, and the solar absorptance were calculated according to JIS A 5759. (Here, the solar absorptance was calculated from solar absorptance (%)=100%−solar transmittance (%)−solar reflectance (%).)

Tables 2, 4, and 6 show the results.

Comparative Example 5

The spectral properties of the polyethylene film containing $TiO_2$ fine particles as a white light reflective material were measured without applying the infrared absorbing material ultrafine particle dispersion liquid.

Table 6 shows the results.

CONCLUSION

As is clear from Table 2, the composite tungsten oxide ultrafine particles contained in the infrared absorbing layer of examples 1 to 27 are the composite tungsten oxide ultrafine particles having an XRD peak top intensity ratio value of 0.13 or more based on the XRD peak intensity ratio value of 1 on plane (220) of the silicon powder standard sample (640c produced by NIST), and having the crystallite size of 1 nm or more.

Here, according to the examples, the average particle size and the crystallite size of the composite tungsten oxide ultrafine particles in the infrared absorbing layer are almost the same, and therefore it is considered that the composite tungsten oxide ultrafine particles used are single crystal composite tungsten oxide ultrafine particles in which the volume ratio of the amorphous phase is 50% or less.

In contrast, according to comparative examples 1, 2, and 4, it is considered that the average particle size of the composite tungsten oxide ultrafine particles in the infrared absorbing layer is larger than the crystallite size and the composite tungsten oxide ultrafine particles are not a single crystal. Further, according to comparative example 3, different phases ($WO_2$ and W) were generated.

As is clear from Table 3, when examples 1 to 26 are compared with comparative examples 1 to 4, it is found that the infrared absorptance of the film is greatly increased, the visible light is reflected, and heat storage is excellent, by forming the infrared absorbing layer which is formed by coating with the composite tungsten oxide ultrafine particles, into the film in which the white light reflecting material is dispersed. Namely, according to examples 1 to 26, it is found that the visible light reflectance can be kept close to 60 to 70%, and the solar absorptance can be improved to about 40 to 60%.

The agricultural and horticultural covering film according to the present invention is the film having the white light reflecting layer containing the white light reflecting material, and the infrared absorbing layer containing the infrared absorbing material ultrafine particles, and specifically the film with the white light reflecting layer having the white light reflecting material dispersed inside; the film having an infrared absorbing layer formed by coating one surface of the film with infrared absorbing material ultrafine particles; the film in which the white light reflecting material and the infrared absorbing material ultrafine particles are dispersed inside thereof to form a white light reflecting layer and an infrared absorbing layer; and the film having the white light reflecting layer formed by coating its one surface with the white light reflecting material, and the infrared light absorbing layer formed by further coating the white light reflecting layer with the infrared absorbing material ultrafine particles, or having the white light reflecting layer formed by coating its one surface with the white light reflecting material, and the infrared absorbing layer formed by coating its other surface with the infrared absorbing material ultrafine particles.

By such a simple method, it is possible to provide the agricultural and horticultural covering film having a good weather resistance, at a low cost, and capable of efficiently absorbing the near-infrared rays from the sunlight with a small amount of ultrafine particles, by forming the infrared absorbing layer containing the composite tungsten oxide ultrafine particles as the infrared absorbing material ultrafine particles.

TABLE 1

| | Raw material | Firing condition | | | | | | | | Pulverization/dispersion condition | | |
|---|---|---|---|---|---|---|---|---|---|---|---|---|---|
| | | Thermal plasma method | | | | | | Solid-phase reaction | | | | |
| | | Plasma temperature [K] | a [kW] | Carrier gas (Ar) (L/min) | Plasma gas (Ar) (L/min) | Sheeth gas (Ar) (L/min) | b (g/min) | Furnace temperature [° C.] | Furnace gas | Firing time | Solvent | c (h) | Drying treatment time |
| Example 1 | $Cs_2CO_3$ & $H_2WO_4$ | 10000~15000 | 40 | 9 | 30 | Ar55 He5 | 50 | — | | | Toluene | 0.5 | — |
| Example 2 | | 10000~15000 | 40 | 8 | 30 | Ar55 He5 | 25 | | | | | 0.5 | — |
| Example 3 | | 10000~15000 | 40 | 8 | 30 | Ar55 He5 | 25 | | | | | 0.5 | — |
| Example 4 | | 10000~15000 | 40 | 9 | 45 | Ar55 He5 | 50 | | | | | 0.5 | — |
| Example 5 | | 10000~15000 | 40 | 9 | 30 | Ar55 He5 | 50 | | | | | 0.5 | — |
| Example 6 | | 10000~15000 | 40 | 8 | 45 | Ar55 He5 | 25 | | | | | 0.5 | — |
| Example 7 | $Cs_{0.33}WO_3$ | 10000~15000 | 40 | 9 | 30 | Ar55 He5 | 50 | | | | | 0.5 | — |
| Example 8 | | 10000~15000 | 40 | 8 | 30 | Ar55 He5 | 25 | | | | | 0.5 | — |
| Example 9 | $Rb_2CO_3$ & $H_2WO_4$ | 10000~15000 | 40 | 9 | 30 | Ar55 He5 | 50 | | | | | 0.5 | — |
| Example 10 | $K_2CO_3$ & $H_2WO_4$ | 10000~15000 | 40 | 9 | 30 | Ar55 He5 | 50 | | | | | 0.5 | — |
| Example 11 | $TlNO_2$ & $H_2WO_4$ | 10000~15000 | 40 | 9 | 30 | Ar55 He5 | 50 | | | | | 0.5 | — |
| Example 12 | $BaCO_2$ & $H_2WO_4$ | 10000~15000 | 40 | 9 | 30 | Ar55 He5 | 50 | | | | | 0.5 | — |
| Example 13 | $K_2CO_2$ & $Cs_2CO_3$ & $H_2WO_4$ | 10000~15000 | 40 | 9 | 30 | Ar55 He5 | 50 | | | | | 0.5 | — | a = High frequency power
b = Raw material feed rate
c = Pulverization/dispersion treatment time

TABLE 2

| | Raw material | Firing condition Thermal plasma method | | | | |
|---|---|---|---|---|---|---|
| | | Plasma temperature [K] | a [kW] | Carrier gas (Ar) (L/min) | Plasma gas (Ar) (L/min) | Sheeth gas (Ar) (L/min) | b (g/min) |
| Example 14 | $Cs_2CO_3$ & $H_2WO_4$ | — | | | | |
| Example 15 | | — | | | | |
| Example 16 | | — | | | | |
| Example 17 | | — | | | | |
| Example 18 | | — | | | | |
| Example 19 | | — | | | | |
| Example 20 | | — | | | | |
| Example 21 | | — | | | | |
| Example 22 | | — | | | | |

TABLE 2-continued

| Example | | | | | | | |
|---|---|---|---|---|---|---|---|
| Example 23 | — | | | | | | |
| Example 24 | Same as example 1 | | | | | | |
| Example 25 | Same as example 1 | | | | | | |
| Example 26 | Same as example 1 | | | | | | |
| Com. Ex. 1 | $Cs_2CO_3$ & $H_2WO_4$ | 10000~15000 | 40 | 3 | 30 | Ar55 He5 | 15 |
| Com. Ex. 2 | | 10000~15000 | 40 | 9 | 15 | Ar55 He5 | 50 |
| Com. Ex. 3 | | 5000~10000 | 15 | 9 | 30 | Ar55 He5 | 50 |
| Com. Ex. 4 | — | | | | | | |

| | Firing Condition Solid-phase reaction | | | Pulverization/ dispersion condition | | |
|---|---|---|---|---|---|---|
| | Furnace temperature [° C.] | Furnace gas | Firing time (min) | Solvent | c (h) | Drying treatment time |
| Example 14 | 800 | $N_2$ carrier, 2% $H_2$ | 30 | Toluene | 2 | — |
| | 800 | $N_2$ stomosphere | 90 | | | |
| Example 15 | 800 | $N_2$ carrier, 5% $H_2$ | 80 | Water | 2 | Air dryer |
| | 800 | $N_2$ stomosphere | 120 | | | |
| Example 16 | 800 | | 80 | | 2 | d |
| | 800 | | 120 | | | |
| Example 17 | 800 | | 80 | | 2 | Spray dryer |
| | 800 | | 120 | | | |
| Example 18 | 800 | | 80 | | 1 | Air dryer |
| | 800 | | 120 | | | |
| Example 19 | 800 | | 80 | | 1 | d |
| | 800 | | 120 | | | |
| Example 20 | 800 | | 80 | | 1 | Spray dryer |
| | 800 | | 120 | | | |
| Example 21 | 800 | | 80 | Propylene glycol ether | 2 | Air dryer |
| | 800 | | 120 | | | |
| Example 22 | 800 | | 80 | | 2 | d |
| | 800 | | 120 | | | |
| Example 23 | 800 | | 80 | | 2 | Spray dryer |
| | 800 | | 120 | | | |
| Example 24 | Same as example 1 | | | Toluene | 0.5* | — |
| Example 25 | Same as example 1 | | | | | Spray dryer |
| Example 26 | Same as example 1 | | | | | |
| Com. Ex. 1 | — | | | Toluene | 0.5 | — |
| Com. Ex. 2 | — | | | | 0.5 | |

TABLE 2-continued

|  | a | b | c | | | |
|---|---|---|---|---|---|---|
| Com. Ex. 3 | — |  |  | 0.5 | — |  |
| Com. Ex. 4 | 800 | N₂ carrier, 5% H₂ | 80 | Water | 20 | Air dryer |
|  | 800 | N₂ stomo-sphere | 120 |  |  |  |

Com. Ex. = Comparative Example
*Ultrasonic homogenizer 0.5 hours
a = High frequency power
b = Raw material feed rate
c = Pulverization/dispersion treatment time
d = Ishikawa-type stirring crusher

TABLE 3

|  | Crystal system | Hetero phase | Peak top intensity a (Count) | Peak top intensity b (Count) | c | Peak top intensity ratio | d [°] | BET [m²/g] | x/y | e [nm] | Crystallize size [nm] | Volatile component (mass %) |
|---|---|---|---|---|---|---|---|---|---|---|---|---|
| Example 1 | Hexagonal | None | 4200 | 3000 | 19800 | 0.15 | 27.8 | 80.0 | 0.29 | 70 | 16.9 | 1.6 |
| Example 2 | crystal |  | 4700 | 3400 | 19800 | 0.17 | 27.8 | 51.6 | 0.29 | 80 | 19.5 | 1.5 |
| Example 3 | structure |  | 5400 | 4200 | 19800 | 0.21 | 27.8 | 41.6 | 0.29 | 80 | 21.1 | 1.4 |
| Example 4 |  |  | 4500 | 3100 | 19800 | 0.16 | 27.8 | 54.8 | 0.29 | 80 | 18.7 | 1.6 |
| Example 5 |  |  | 4400 | 3100 | 19800 | 0.16 | 27.8 | 57.8 | 0.29 | 70 | 17.9 | 1.6 |
| Example 6 |  |  | 5800 | 4500 | 19800 | 0.23 | 27.8 | 37.8 | 0.30 | 80 | 28.2 | 1.3 |
| Example 7 |  |  | 5200 | 4000 | 19800 | 0.20 | 27.8 | 44.7 | 0.29 | 80 | 23.0 | 1.4 |
| Example 8 |  |  | 5700 | 4400 | 19800 | 0.22 | 27.8 | 38.3 | 0.30 | 80 | 29.0 | 1.3 |
| Example 9 |  |  | 4000 | 3000 | 19800 | 0.15 | 27.9 | 62.5 | 0.32 | 70 | 17.2 | — |
| Example 10 |  |  | 3800 | 2900 | 19800 | 0.15 | 27.9 | 84.2 | 0.27 | 80 | 17.5 | — |
| Example 11 |  |  | 4000 | 2900 | 19800 | 0.15 | 27.9 | 62.3 | 0.19 | 80 | 18.5 | — |
| Example 12 |  |  | 4200 | 3100 | 19800 | 0.16 | 28.1 | 60.8 | 0.14 | 70 | 17.3 | — |
| Example 13 |  |  | 4000 | 3200 | 19800 | 0.16 | 28.0 | 62.3 | 0.39 | 80 | 18.0 | — | a = Raw material powder
b = After dispersion
c = Peak intensity on plane (220) of a silicon powder standard sample
d = Peak position 2 θ
e = Dispersed particle size in dispersion liquid

TABLE 4

|  | Crystal system | Hetero phase | Peak top intensity a (Count) | Peak top intensity b (Count) | c | Peak top intensity ratio | d [°] | BET [m²/g] | x/y | e [nm] | Crystallize size [nm] | Volatile component (mass %) |
|---|---|---|---|---|---|---|---|---|---|---|---|---|
| Example 14 | Hexagonal | None | 23000 | 4200 | 19800 | 0.21 | 27.8 | 1.2 | 0.53 | 80 | 23.5 | — |
| Example 15 | crystal |  | 4200 | 4200 | 19800 | 0.21 | 27.8 | 42.5 | 0.53 | 80 | 23.7 | 2.2 |
| Example 16 | structure |  | 4200 | 4200 | 19800 | 0.21 | 27.8 | 41.2 | 0.33 | 80 | 24.1 | 1.5 |
| Example 17 |  |  | 4100 | 4100 | 19800 | 0.21 | 27.8 | 42.3 | 0.33 | 80 | 23.9 | 1.5 |
| Example 18 |  |  | 6200 | 6200 | 19800 | 0.31 | 27.8 | 34.3 | 0.33 | 80 | 38.2 | 1.5 |
| Example 19 |  |  | 6900 | 8400 | 19800 | 0.30 | 27.8 | 32.2 | 0.33 | 80 | 37.8 | 1.2 |
| Example 20 |  |  | 6000 | 9000 | 19800 | 0.30 | 27.8 | 31.3 | 0.33 | 80 | 38.5 | 1.3 |
| Example 21 |  |  | 5500 | 9500 | 19800 | 0.28 | 27.8 | 31.3 | 0.33 | 80 | 36.7 | 1.6 |
| Example 22 |  |  | 5400 | 5400 | 19800 | 0.27 | 27.8 | 32.3 | 0.35 | 80 | 36.3 | 1.3 |
| Example 23 |  |  | 5300 | 5300 | 19800 | 0.27 | 27.8 | 33.2 | 0.33 | 80 | 36.0 | 1.3 |
| Example 24 |  |  |  |  |  | Same as example 1 |  |  |  |  |  |  |
| Example 25 |  |  |  |  |  |  |  |  |  |  |  |  |
| Example 26 |  |  |  |  |  |  |  |  |  |  |  |  |
| Com. Ex. 1 | Hexagonal | None | 1000 | 1000 | 19800 | 0.05 | 27.8 | 90.2 | 0.28 | 80 | 8.0 | — |
| Com. Ex. 2 | crystal |  | 1100 | 1100 | 19800 | 0.06 | 27.8 | 86.0 | 0.28 | 80 | 8.2 | — |
| Com. Ex. 3 | structure | WO₂ & W | 3800 | 2400 | 19800 | 0.12 | 27.8 | 43.0 | 0.29 | 80 | 22.9 | — |
| Com. Ex. 4 |  | None | 1300 | 1300 | 19800 | 0.07 | 27.8 | 102.8 | 0.33 | 120 | 0.1 | 2.2 |

Com. Ex. = Comparative Example
a = Raw material powder
b = After dispersion
c = Peak intensity on plane (220) of a silicon powder standard sample
d = Peak position 2 θ
e = Dispersed particle size in dispersion liquid

TABLE 5

| | Type of white light reflecting material | Properties of infrared absorbing layer | | | | |
|---|---|---|---|---|---|---|
| | | a [%] | b [%] | c [%] | d [%] | e [%] |
| Example 1 | TIO$_2$ | 11.1 | 9.8 | 68.1 | 41.4 | 48.8 |
| Example 2 | | 11.1 | 9.8 | 69.1 | 41.5 | 48.6 |
| Example 3 | | 11.1 | 9.9 | 89.0 | 41.7 | 48.4 |
| Example 4 | | 11.1 | 9.9 | 89.2 | 41.4 | 48.7 |
| Example 5 | | 11.0 | 9.7 | 70.0 | 41.8 | 48.7 |
| Example 6 | | 11.0 | 9.7 | 70.1 | 40.8 | 49.4 |
| Example 7 | | 11.0 | 9.7 | 89.9 | 41.5 | 48.8 |
| Example 8 | | 11.1 | 9.9 | 89.1 | 41.3 | 48.8 |
| Example 9 | | 11.4 | 10.7 | 71.7 | 44.0 | 45.3 |
| Example 10 | | 11.7 | 10.7 | 71.6 | 43.9 | 45.4 |
| Example 11 | | 11.6 | 10.9 | 73.7 | 45.3 | 42.8 |
| Example 12 | | 11.6 | 10.9 | 73.5 | 48.5 | 42.6 |
| Example 13 | | 11.4 | 10.7 | 71.7 | 44.1 | 45.2 | a = Visible light transmittance
b = Solar transmittance
c = Visible light reflectance
d = Solar reflectance
e = Solar absorption

TABLE 6

| | Type of white light reflecting material | Properties of infrared absorbing layer | | | | |
|---|---|---|---|---|---|---|
| | | a [%] | b [%] | c [%] | d [%] | e [%] |
| Example 14 | TIO$_2$ | 10.9 | 9.1 | 68.1 | 40.4 | 50.5 |
| Example 15 | | 10.9 | 9.1 | 68.2 | 40.5 | 50.4 |
| Example 16 | | 10.9 | 9.2 | 68.1 | 40.4 | 50.4 |
| Example 17 | | 10.9 | 9.1 | 68.0 | 40.4 | 50.5 |
| Example 18 | | 11.0 | 9.2 | 70.2 | 40.8 | 50.0 |
| Example 19 | | 11.0 | 9.3 | 70.1 | 41.2 | 49.5 |
| Example 20 | | 11.1 | 9.4 | 68.9 | 41.4 | 48.2 |
| Example 21 | | 11.0 | 9.2 | 69.9 | 41.9 | 48.9 |
| Example 22 | | 11.1 | 9.4 | 69.2 | 41.4 | 49.2 |
| Example 23 | | 11.1 | 9.4 | 69.1 | 41.5 | 49.1 |
| Example 24 | | 11.2 | 10.1 | 69.5 | 41.5 | 48.4 |
| Example 25 | | 10.2 | 7.9 | 62.1 | 34.0 | 58.1 |
| Example 26 | | 11.7 | 11.0 | 75.3 | 48.1 | 40.9 |
| Com. Ex. 1 | TIO$_2$ | 16.1 | 14.6 | 84.1 | 59.0 | 26.2 |
| Com. Ex. 2 | | 16.7 | 15.4 | 86.5 | 61.4 | 23.2 |
| Com. Ex. 3 | | 14.1 | 13.4 | 81.4 | 54.5 | 32.1 |
| Com. Ex. 4 | | 14.3 | 13.7 | 81.9 | 55.1 | 31.2 |
| Com. Ex. 5 | | 14.3 | 19.8 | 84.0 | 71.0 | 9.2 |

Com. Ex. = Comparative Example
a = Visible light transmittance
b = Solar transmittance
c = Visible light reflectance
d = Solar reflectance
e = Solar absorption

DESCRIPTION OF SIGNS AND NUMERALS

1 Thermal plasma
2 High frequency coil
3 Sheath gas feeding nozzle
4 Plasma gas feeding nozzle
5 Raw material powder feeding nozzle
6 Reaction vessel
7 Suction tube
8 Filter

The invention claimed is:

1. An agricultural and horticultural film having an infrared absorbing layer containing infrared absorbing material ultrafine particles,
wherein the infrared absorbing material ultrafine particles are composite tungsten oxide ultrafine particles,
the composite tungsten oxide ultrafine particles have a XRD peak top intensity ratio value of 0.13 or more based on an XRD peak intensity ratio value of 1 on plane (220) of a silicon powder standard sample (640c produced by NIST),
a dispersed particle size of the composite tungsten oxide ultrafine particles is 10 nm or more and 200 nm or less,
a crystallite size of the composite tungsten oxide ultrafine particles is 10 nm or more and 200 nm or less, and
each of the composite tungsten oxide ultrafine particles is made of a single crystal in which a volume ratio of an amorphous phase in the composite tungsten oxide ultrafine particles is less than 50%.

2. The agricultural and horticultural film according to claim 1, wherein the infrared absorbing layer in which the infrared absorbing material ultrafine particles are dispersed in a resin binder is provided on at least one surface of an agricultural and horticultural covering film.

3. The agricultural and horticultural film according to claim 1, wherein the infrared absorbing material ultrafine particles are present in a dispersed state inside an agricultural and horticultural covering film.

4. The agricultural and horticultural film according to claim 1, wherein the composite tungsten oxide ultrafine particles are represented by a general formula $M_xW_yO_z$ (wherein M element is an element of one or more kinds selected from the group consisting of H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, $2.2 \leq z/y \leq 3.0$).

5. The agricultural and horticultural film according to claim 1, wherein the composite tungsten oxide ultrafine particles include a hexagonal crystal structure.

6. The agricultural and horticultural film according to claim 1, wherein a content of a volatile component in the composite tungsten oxide ultrafine particles is 2.5 mass % or less.

7. The agricultural and horticultural film according to claim 1, wherein a surface of the composite tungsten oxide ultrafine particles is coated with an oxide containing one or more elements selected from the group consisting of Si, Ti, Zr, and Al.

8. The agricultural and horticultural film according to claim 1, wherein the film is at least one selected from the group consisting of polyethylene, polypropylene, polyethylene terephthalate, polyvinyl fluoride, polyvinylidene fluoride, polytetrafluoroethylene, tetrafluoroethylene-ethylene copolymer, polychlorotrifluoroethylene, tetrachlorotrifluoroethylene, polyvinyl chloride, polyvinylidene chloride, polyvinyl alcohol, polystyrene, ethylene vinyl acetate, and polyester resin.

9. The agricultural and horticultural film according to claim 1, wherein a white light reflecting layer in which a white reflecting material is dispersed is provided inside an agricultural and horticultural covering film.

10. The agricultural and horticultural film according to claim 9, wherein the white light reflecting material is at least one selected from the group consisting of TiO$_2$, ZrO$_2$, SiO$_2$, Al$_2$O$_3$, MgO, ZnO, CaCO$_3$, BaSO$_4$, ZnS, and PbCO$_3$.

11. The agricultural and horticultural film according to claim 1:
having a white light reflecting layer formed by coating a first surface with a white light reflecting material, and an infrared light absorbing layer formed by further coating the white light reflecting layer with infrared absorbing material ultrafine particles, or having a white light reflecting layer formed by coating a first surface with a white light reflecting material, and an infrared absorbing layer formed by coating a second surface with infrared absorbing material ultrafine particles.

\* \* \* \* \*